United States Patent
Piskunov et al.

(10) Patent No.: US 12,099,282 B2
(45) Date of Patent: Sep. 24, 2024

(54) TUNABLE OPTICAL LENS AND ELECTRONIC APPARATUS EMPLOYING THE SAME

(71) Applicant: SAMSUNG ELECTRONICS CO., LTD., Suwon-si (KR)

(72) Inventors: Dmitriy Evgenyevich Piskunov, Moscow region (RU); Svetlana Vladimirovna Danilova, Moscow region (RU); Nikolay Victorovich Muravev, Moscow region (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 17/396,335

(22) Filed: Aug. 6, 2021

(65) Prior Publication Data
US 2022/0057691 A1    Feb. 24, 2022

(30) Foreign Application Priority Data

Aug. 19, 2020  (RU) .............................. 2020127687
Apr. 19, 2021  (KR) ....................... 10-2021-0050706

(51) Int. Cl.
*G02F 1/29* (2006.01)
*G02C 7/08* (2006.01)
*G02B 27/01* (2006.01)
*G06F 3/01* (2006.01)
*G06T 19/00* (2011.01)

(52) U.S. Cl.
CPC ............ *G02F 1/292* (2013.01); *G02C 7/083* (2013.01); *G02F 1/294* (2021.01); *G02B 27/0172* (2013.01); *G06F 3/011* (2013.01); *G06T 19/006* (2013.01)

(58) Field of Classification Search
None
See application file for complete search history.

(56) References Cited

U.S. PATENT DOCUMENTS 5,285,314 A       2/1994   Futhey
7,755,583 B2 *   7/2010   Meredith ............ G02F 1/13306
                                                    349/167

(Continued)

FOREIGN PATENT DOCUMENTS

CN        1666576 A       9/2005
CN      101389956 A       3/2009
(Continued)

OTHER PUBLICATIONS

Communication dated Feb. 19. 2021, from the Russian Federal Service for Intellectual Property in Application No. 2020127687/28.

*Primary Examiner* — Dung T Nguyen
(74) *Attorney, Agent, or Firm* — Sughrue Mion, PLLC

(57) ABSTRACT

A tunable optical lens having an adjustable focal length includes an electro-active material layer, and a control electrode having a plurality of electrode components, wherein the control electrode includes at least two electrode patterns each of which is configured to generate one or more different diffraction zones, and the at least two electrode patterns are configured to generate different phase profiles from each other with respect to light transmitted through the at least two electrode patterns, when a voltage is applied to the control electrode.

17 Claims, 15 Drawing Sheets

(56) References Cited

U.S. PATENT DOCUMENTS

| | | |
|---|---|---|
| 8,243,251 B2 | 8/2012 | Yokoyama |
| 8,263,386 B2 | 9/2012 | Yoo |
| 8,300,167 B2 | 10/2012 | Hirato |
| 8,885,139 B2 | 11/2014 | Peyghambarian et al. |
| 8,951,779 B2 | 2/2015 | Yoo |
| 8,988,649 B2 | 3/2015 | Jeong et al. |
| 9,129,552 B2 | 9/2015 | Magno et al. |
| 9,140,920 B2 | 9/2015 | Afshari et al. |
| 9,279,818 B2 | 3/2016 | Yoo |
| 9,557,572 B2 | 1/2017 | Jeong et al. |
| 9,588,349 B2 | 3/2017 | Song et al. |
| 9,985,249 B2 | 5/2018 | Magno et al. |
| 10,276,821 B2 | 4/2019 | Wu et al. |
| 11,360,346 B2 * | 6/2022 | Danilova ............... G02F 1/294 |
| 2007/0288193 A1 | 12/2007 | Lima |
| 2015/0124183 A1 * | 5/2015 | Choi ............... G02F 1/133345 349/15 |
| 2016/0195739 A1 | 7/2016 | Choi et al. |
| 2016/0202524 A1 | 7/2016 | Yum et al. |
| 2017/0068134 A1 | 3/2017 | Yadin et al. |
| 2018/0246354 A1 | 8/2018 | Popovich et al. |
| 2020/0057309 A1 | 2/2020 | Miller et al. |

FOREIGN PATENT DOCUMENTS

| | | |
|---|---|---|
| CN | 101636688 B | 12/2011 |
| CN | 101213447 B | 9/2012 |
| EP | 1 888 778 B1 | 11/2012 |
| EP | 1 917 525 B1 | 12/2017 |
| JP | 5289327 B2 | 9/2013 |
| KR | 10-2016-0086493 A | 7/2016 |
| WO | 03/101156 A1 | 12/2003 |
| WO | 2005/116619 A1 | 12/2005 |
| WO | 2006/121266 A1 | 11/2006 |
| WO | 2007/001160 A1 | 1/2007 |
| WO | 2007/073107 A1 | 6/2007 |
| WO | 2011/050455 A1 | 5/2011 |
| WO | 2017/216716 A1 | 12/2017 |

* cited by examiner

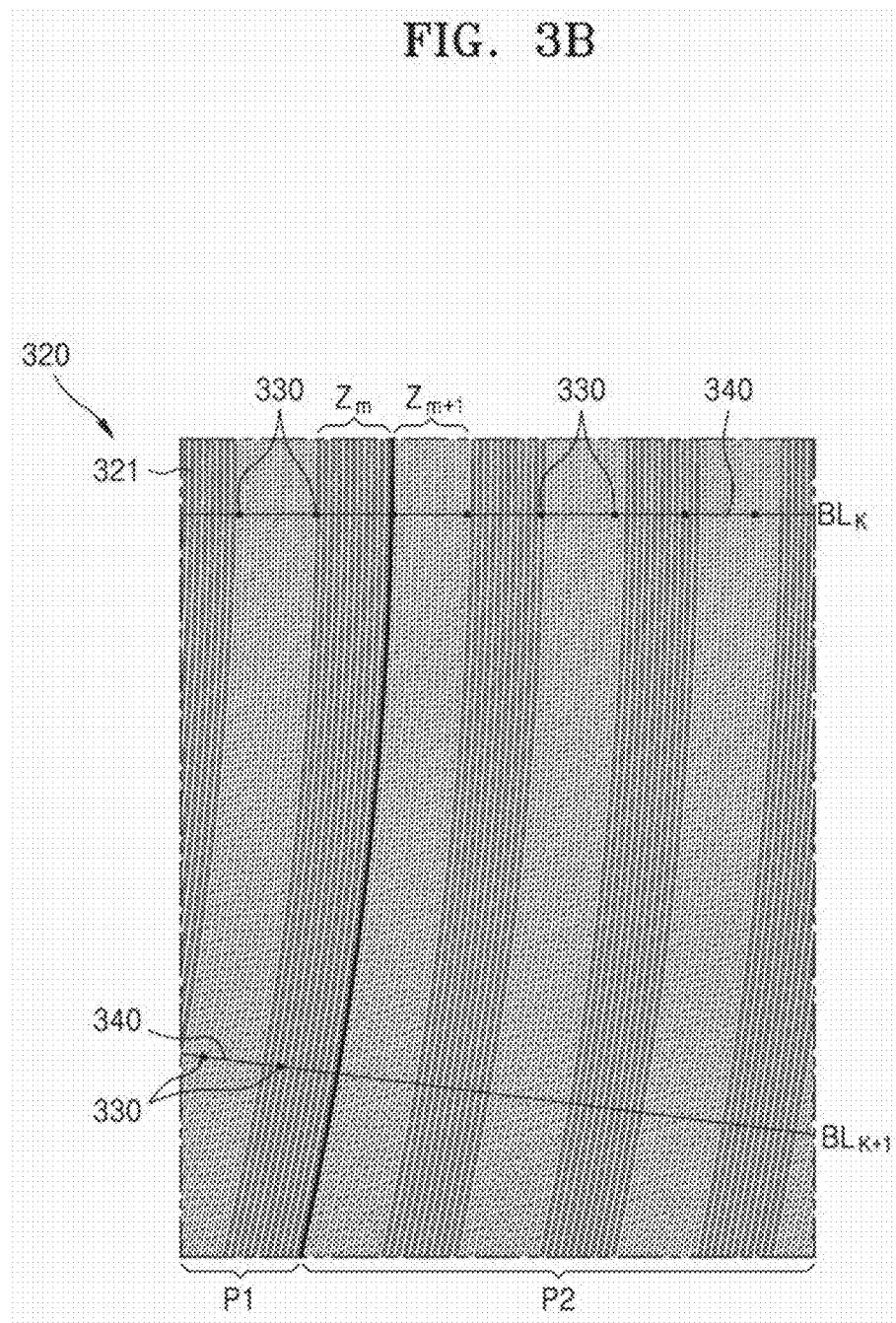

TUNABLE OPTICAL LENS AND ELECTRONIC APPARATUS EMPLOYING THE SAME

CROSS-REFERENCE TO RELATED APPLICATIONS

This application is based on and claims priority under 35 U.S.C. § 119 to Russian Patent Application No. 2020127687, filed on Aug. 19, 2020, in the Russian Patent Office, and Korean Patent Application No. 10-2021-0050706, filed on Apr. 19, 2021, in the Korean Intellectual Property Office, the disclosures of which are incorporated by reference herein in their entireties.

BACKGROUND

1. Field

The disclosure relates to a tunable optical lens and an electronic apparatus employing the tunable optical lens.

2. Description of Related Art

In an augmented reality or virtual reality (AR/VR) system, it is very important to design an optical mechanism, that is, a display device, to display, to a user, a virtual image or an augmented reality image that is a virtual image overlapped with a real world image. For example, from a viewpoint of a user, for a current image forming optical system of an AR/VR system, it is required to provide a virtual object image with a realistic sense of depth, a high quality image in a central field of view, a clear image to users who may have an eye refraction abnormality, a relatively short response time, miniaturization of a display device, and the like.

Recently, designers of an optical system used in the AR/VR system face some challenges. To incorporate an AR/VR optical system into compact headsets, goggles, and the like, examples of challenges include providing a lens having a relatively large aperture, increasing a diffraction efficiency to, for example, 80% or more, reducing the size, in particular, thickness, of the optical system, and the like.

Furthermore, a method of quickly adjusting a focal length in a preset dioptric step by using light and compact parts is required.

In the AR/VR system, a diffraction liquid crystal (LC) lens having a multi-phase level to provide a sense of a great depth of field to a virtual object image has been researched.

A large aperture diameter may be implemented by using a large size lens or a lens having a large number of addressable electrodes for forming an active electrode array. However, such existing technologies have a problem in high costs and bulky volume. For example, a lens according to related art uses multiple electrodes to increase an aperture diameter. However, these electrodes are difficult to manufacture due to their small size, in particular, small width.

Furthermore, one of the problems of the existing technologies is a vergence accommodation conflict (VAC) that causes fatigue to eyes of a user. In most existing AR/VR headsets, a focal length is fixed and a virtual image may not be moved beyond the focal length. For this reason, in the existing technology, in an accommodation process, a length of a focus formed by a user's eye and an eye vergence are not placed on one plane. This causes fatigue to the user's eye and also headache and nausea. Accordingly, when real world objects located at different distances and a virtual object (image) at a fixed focal length are viewed simultaneously through an AR device according to related art, a so-called VAC is generated. In other words, in the AR device according to related art, only one of a virtual object and a real world object is focused, and thus it is difficult to simultaneously focus the virtual object and the real world object. In the VR device according to related art, a VAC is generated when a focal plane (accommodation of eyes toward a display) does not correspond to a relative size of an object (eye axes vergence toward the object).

In most existing AR/VR devices, as a focal length is fixed, a refraction abnormality of a user's eye due to presbyopia, hyperopia, and myopia may not be corrected. For the user to normally use an existing AR/VR device, additional vision correction means such as a contact lens or glasses is needed. This may have a negative effect on the overall size of an AR/VR device because, in the existing technologies, a user with an eye refraction abnormality needs to use a lens matching an AR/VR device or general glasses together with the AR/VR device.

The AR/VR system needs a large lens aperture to provide a realistic depth of field of a virtual object image. In recently existing technologies, the maximum aperture diameter has been achieved by using a diffraction liquid crystal (LC) lens having a multi-phase level. The aperture of a LC lens is divided into multiple Fresnel zones, and each Fresnel zone includes a plurality of control electrode components. As the lens aperture diameter increases, the number of Fresnel zones that divides the lens aperture increases. Accordingly, as the number of Fresnel zones increases, the size of each Fresnel zone decreases. As the size of each Fresnel zone decreases, the width of each of control electrode components provided in each Fresnel zone decreases. For example, to obtain a lens aperture diameter greater than 30 mm in an existing LC lens having an optical power of 3 diopter (D) at its maximum, a control electrode component having a size in particular, width, of less than 1 µm is needed, but such an electrode size is less than a current technical limit.

U.S. Pat. No. 5,285,314 (Minnesota Mining and Manufacturing Company, 1994.02. 08) discloses a superzone mirror having a plurality of diffraction areas formed by a plurality of grooves. A diffractive optical power is generated by a plurality of diffraction areas. The depth of each groove is an integer multiple of a standard depth and the grooves are formed to a sufficient width so that optical power by diffraction is generated. The existing technology has a demerit in that a mirror is manufactured of a reflective material, not an electro-active material and focal length adjustment and/or optical power adjustment are not provided.

WO2017216716 (Optica Amuka (A.A.) LTD, 2017. 12. 21) discloses a system of moving over an active area by using eye tracking across an overall lens aperture where an electrode pattern including an electrode having the same width is used. A continuous change of an optical output is made. The system has demerits of having to use a large number of addressable electrodes (a minimum of 100-400 electrodes for a flat flexible cable (FFC)), and needing a small active area size and eye tracking, which makes the system very complicated.

U.S. Pat. No. 8,885,139 (Johnson & Johnson Vision Care, 2014. 11. 11) discloses a diffractive lens with an adjustable focal length including an electro-active material (liquid crystal lens) configured to discretely and continuously adjust a focal length. In the system of the existing technology, the focal length is changed by shunting corresponding control electrodes in adjacent Fresnel zones. The solution of the existing technology has a demerit in which, as the width of an external electrode is very small, a lens is manufactured in a complicated process.

U.S. Pat. No. 8,988,649 (Samsung Display, 2015. 03. 24) discloses an image display device using a diffractive lens including a first electrode array and a second electrode array, both serving as a Fresnel zone plate. One demerit of a solution of the existing technology is that, as the width of a control electrode decreases closer to an outer edge of a lens, the width of an external electrode decreases to be very small, and as a result, the manufacture of the existing technology becomes very complicated.

JP 5289327 (Citizen Holdings Co., Ltd., 2013. 09. 11) discloses a liquid crystal Fresnel lens providing a high focus performance. The liquid crystal Fresnel lens of the existing technology includes a group of divided concentric ring electrodes, a common electrode located to face the ring electrode group, a liquid crystal layer arranged between the ring electrodes and the common electrode, a first lens segment area, and a second lens segment area. The first lens segment area includes a plurality of first ring electrodes among the ring electrode group and generates a first phase delay distribution by using the first ring electrodes. The second lens segment area is disposed outside a lens with respect to the first lens segment area and includes a plurality of second ring electrodes among the ring electrode group and generates a second phase delay distribution by using the second ring electrodes. A phase delay distribution similar to a phase delay distribution of a Fresnel lens is generated along the first and second lens segment areas, and the number of ring electrodes in the second ring electrodes is less than the number of ring electrodes in the first ring electrodes. However, in the above solution of the existing technology, a difference between phase delays generated by the ring electrodes is the same between two adjacent ring electrodes. The maximum delay value of the first lens segment area is the same as that of the second lens segment area. The application of a given control voltage to a specific ring electrode of the first ring electrodes generates a specific phase delay value, and the application of the same specific control voltage to each of the second ring electrodes generates the above-described specific phase delay value and the same phase delay value. One of demerits of the existing technology includes that only liquid crystal is used as the electro-active material, an electrode having only a concentric circular ring shape having the same phase delay difference between adjacent electrodes of each segment is used, and the same maximal phase is generated for each lens segment.

SUMMARY

Provided are a tunable optical lens having a large aperture and being easy to manufacture, and an electronic apparatus employing the tunable optical lens.

Provided are a tunable optical lens having high diffraction efficiency, and an electronic apparatus employing the tunable optical lens.

Provided are a tunable optical lens providing a realistic sense of depth of a virtual object image, and an electronic apparatus employing the tunable optical lens.

The technical objectives to be achieved are not limited to the above-described objectives, and other technical objectives may exist.

Additional aspects will be set forth in part in the description which follows and, in part, will be apparent from the description, or may be learned by practice of embodiments of the disclosure.

In accordance with an aspect of the disclosure, a tunable optical lens having an adjustable focal length includes an electro-active material layer; and a control electrode including a plurality of electrode components, wherein the control electrode includes at least two electrode patterns, each of the at least two electrode patterns being configured to generate one or more different diffraction zones, and wherein the at least two electrode patterns are configured to generate different phase profiles from each other with respect to light transmitted through the at least two electrode patterns, when a voltage is applied to the control electrode.

Each electrode pattern of the at least two electrode patterns may include at least one electrode group, and each of the at least one electrode group may be configured to generate at least one phase profile.

Each electrode component in any one electrode group in any one electrode pattern of the at least two electrode patterns may be connected to a corresponding electrode component in another electrode group in the any one electrode pattern through a bus.

A number of electrode components in each of at least one electrode group of a first electrode pattern among the at least two electrode patterns may be the same, and a number of electrode components in at least one electrode group of a p-th electrode pattern among the at least two electrode patterns may be the same and may be equal to $K/b^{p-1}$, where K is the number of electrode components in the at least one electrode group of the first electrode pattern and b is an integer.

The first electrode pattern may be located at a center of a lens aperture of the tunable optical lens, and wherein the p-th electrode pattern is sequentially numbered from the center of the lens aperture of the tunable optical lens to an outside of the lens aperture.

A number of buses connecting electrode components of each electrode group of a p-th electrode pattern among the at least two electrode patterns may be $b^{p-1}$ times less than a number of buses connecting electrode components of an electrode pattern among the at least two electrode patterns, wherein b is an integer.

Each of the different phase profiles may include a plurality of quantization levels, and a number of the plurality of quantization levels in a phase profile generated by each electrode group of a p-th electrode pattern among the at least two electrode patterns may be $b^{p-1}$ times less than a number of the plurality of quantization levels in a phase profile generated by each electrode group of a first electrode pattern among the at least two electrode patterns, wherein b is an integer.

For each of the different phase profiles, all heights of the plurality of quantization levels in the phase profile may be equal.

For each of the different phase profiles, heights of at least some quantization levels in the phase profile may be different from heights of other quantization levels in the phase profile.

The tunable optical lens may further include a bus and a circuit component provided between at least some of the plurality of electrode components and the bus.

The circuit component may include at least one from among a resistor, a capacitor, an inductor, or a diode.

The tunable optical lens may further include K buses connecting the plurality of electrode components, wherein the K buses are respectively connected to K electrode components in each diffraction zone of a first electrode pattern among the at least two electrode patterns, and wherein only (1/b)*K buses of the K buses are respectively connected to the plurality of electrode components in each diffraction zone of a second electrode pattern adjacent to the first electrode pattern among the at least two electrode patterns.

A maximal phase of a phase profile generated by a first electrode pattern among the at least two electrode patterns may be the same as a maximal phase of a phase profile generated by a second electrode pattern among the at least two electrode patterns.

A maximal phase of a phase profile generated by a first electrode pattern among the at least two electrode patterns may be different from a maximal phase of a phase profile generated by a second electrode pattern among the at least two electrode patterns.

The tunable optical lens may further include a circular aperture, wherein at least one of the plurality of electrode components has a concentric ring shape.

The at least two electrode patterns may include P electrode patterns sequentially arranged from a center of a lens aperture, wherein a number of electrode components in each diffraction zone of a first electrode pattern of the P electrode patterns that is closest to the center of the lens aperture is K, and wherein a radius $r_{pmk}$ of a k-th electrode component in an m-th diffraction zone of a p-th electrode pattern is equal to:

$$r_{pmk} = \sqrt{A_p \cdot 2\left(m_p - 1 + \frac{k}{K}\right) \cdot \frac{\lambda h}{D}},$$

wherein $A_p$ is an integer indicating a minimal possible maximal phase difference in the p-th electrode pattern, $m_p$ is a number of diffraction zones of the p-th electrode pattern, $\lambda$ is a wavelength of incident light, h is a height of a phase profile having a multiple of $2\pi$ radian, and D is a minimum optical power of the tunable optical lens.

A distance of a first electrode pattern of the at least two electrode patterns from a center of a lens aperture may be smaller than a distance of a second electrode pattern of the at least two electrode patterns from the center of the lens aperture, and a width of an electrode component of the second electrode pattern may be greater than a width of an electrode component of the first electrode pattern.

The tunable optical lens may further include a polygonal aperture, wherein the plurality of electrode components may include at least one electrode component having a vertical stripe shape or a horizontal stripe shape.

In accordance with an aspect of the disclosure, an electronic apparatus includes one or more tunable optical lenses having an adjustable focal length, wherein each of the one or more tunable optical lenses includes an electro-active material layer; and a control electrode including a plurality of electrode components, wherein the control electrode includes at least two electrode patterns, each of the at least two electrode patterns being configured to generate one or more different diffraction zones, and wherein the at least two electrode patterns are configured to generate different phase profiles from each other with respect to light transmitted through the at least two electrode patterns, when a voltage is applied to the control electrode.

The electronic apparatus may further include an augmented reality system or a virtual reality system.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3B is an enlarged view of an area A of FIG. 3A, illustrating an adjacent portion of first and second electrode patterns;

DETAILED DESCRIPTION

Figure 1A:
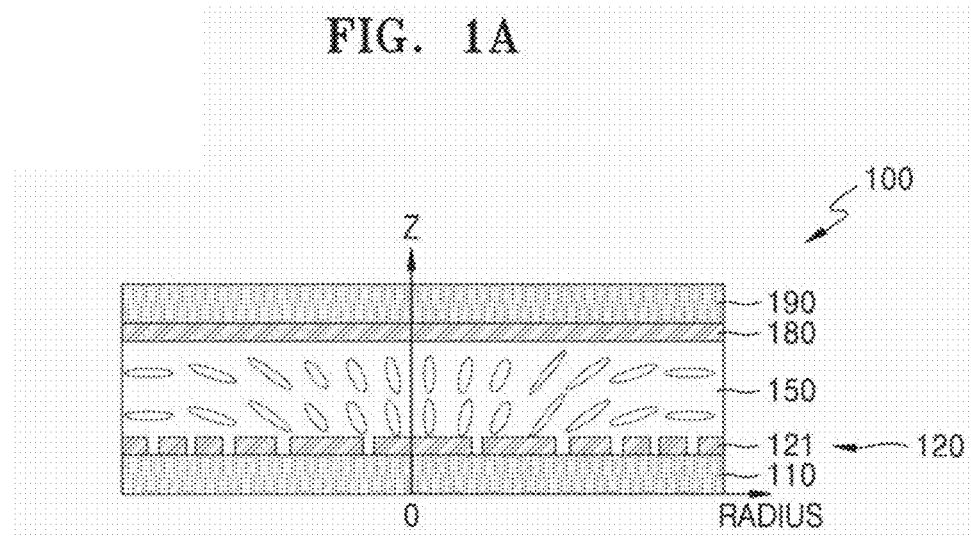
FIG. 1A is a schematic side cross-sectional view of a tunable optical lens according to an embodiment.

Embodiments of the disclosure are provided to further completely explain the disclosure to one of ordinary skill in the art to which the disclosure pertains. However, the disclosure is not limited thereto and it will be understood that various changes in form and details may be made therein without departing from the spirit and scope of the following claims. In the drawings, a part that is not related to a description is omitted to clearly describe the disclosure and, throughout the specification, similar parts are referenced with similar reference numerals.

Throughout the disclosure, the expression "at least one of a, b or c" indicates only a, only b, only c, both a and b, both a and c, both b and c, all of a, b, and c, or variations thereof.

The terms used in the disclosure have been selected from currently widely used general terms in consideration of the functions in the disclosure. However, the terms may vary according to the intention of one of ordinary skill in the art, case precedents, and the advent of new technologies. Also, for special cases, meanings of the terms selected by the applicant are described in detail in the description section. Accordingly, the terms used in the disclosure are defined based on their meanings in relation to the contents discussed throughout the specification, not by their simple meanings.

In the disclosure, a "tunable optical lens" may mean an optical lens having a tunable focal length. In some embodiments, the tunable optical lens may be referred to as a "tunable lens" or a "focus tunable lens". In some embodiments, as the tunable optical lens is configured to form at least two different diffraction zones, the tunable optical lens may be referred to as a "multiple zone" tunable lens.

In the disclosure, an electrode pattern denotes a pattern including electrode components of a control electrode, but in some cases, the term may be used to mean electrode components forming an electrode pattern thereof or collectively refer to a control electrode, which would be clearly understood by a person skilled in the art.

In the disclosure, an "electrode group", as a group of electrode components forming a control electrode, forms a "diffraction zone". In some embodiments, a "diffraction zone" may mean electrode components in a diffraction zone or a group of the electrode components.

In the disclosure, a phase profile may denote dependency of a phase delay of a light wave passing through a surface of a tunable optical lens at coordinates thereon. In the disclosure, a difference between phase delays at different coordinates may be referred to as a phase difference.

The phase profile is divided into diffraction zones depending on a coordinate on a surface of a tunable optical lens. When a phase difference of a light wave propagating to an observation point in a given diffraction zone does not exceed Π (radian), such a zone may be referred to as a Fresnel zone. In the disclosure, each diffraction zone may form at least one Fresnel zone, in particular, a plurality of Fresnel zones, or may form a part of a Fresnel zone.

In the disclosure, a maximal phase may mean a maximal phase delay generated in a given diffraction zone. A range of a phase delay may be divided into a limited number of levels, which is referred to as a quantization level below.

In the disclosure, an "optical power" may mean a force to change a direction of a light ray or a light path by a curved surface of a lens or a diffraction pattern, and may be understood as a term corresponding to refractive power in a typical refractive lens. The unit of an optical power is $m^{-1}$ or diopter (D), and a diopter value is expressed by a reciprocal of a focal length. Furthermore, the diopter may be referred to as a power of a lens having a corresponding optical power. A sign of an optical power is positive (+) when a light ray converges as in a convex lens, and negative (−) when a light ray diverges as in a concave lens.

In the disclosure, "augmented reality (AR)" may mean simultaneously displaying a virtual image by overlaying the same on the physical environment space of a real world or on a real world object.

In the disclosure, a "real scene" is a scene of a real world viewed by an observer or a user through an augmented reality device, and may include a real world object(s).

A "virtual image" may be an image generated through an optical engine. The virtual image may include both of a static image and a dynamic image. The virtual image may be seen with a real scene, and may be an image showing information about a real object in a real scene, information or a control menu about an operation of an augmented reality device, and the like. A "virtual object" may be a part of or the entire area of a virtual image. In an augmented reality device, the virtual object may denote information related to a real object. The virtual object may include at least one of, for example, letters, numbers, symbols, icons, images, and animations.

In the disclosure, the "augmented reality device" may mean a device capable of expressing augmented reality, and may include not only augmented reality glasses in the shape of glasses worn by the user on the face part, but also a head mounted display (HMD) or an augmented reality helmet worn on the head part, and the like.

The disclosure is described below in detail with reference to the accompanying drawings.

Figure 1B:
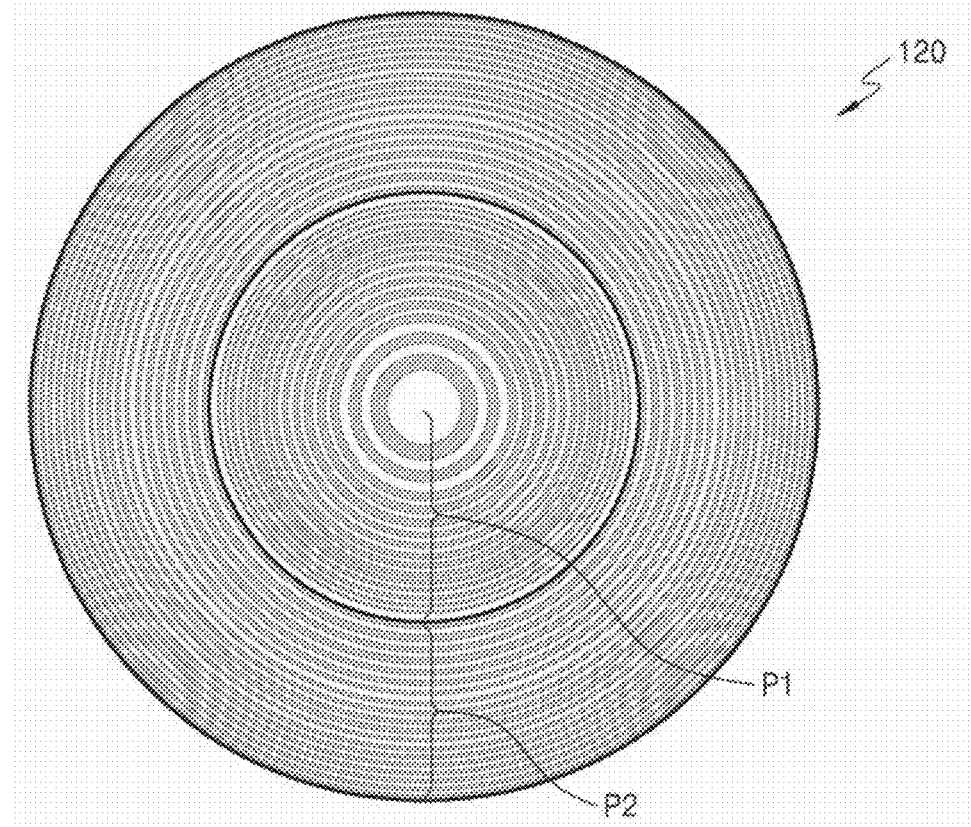
FIG. 1B is a diagram of a control electrode of the tunable optical lens of FIG. 1A.
Figure 1C:
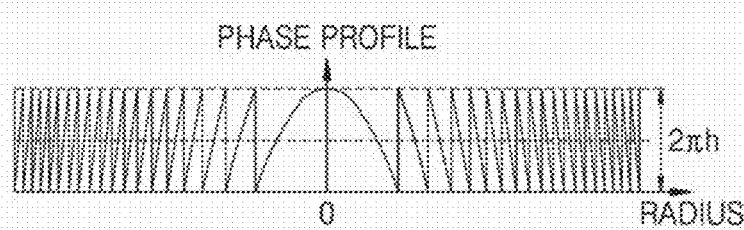
FIG. 1C is a diagram of a phase profile of the tunable optical lens of FIG. 1A.

FIG. 1A is a schematic side cross-sectional view of a tunable optical lens 100 according to an embodiment of the disclosure. FIG. 1B is a diagram of a control electrode 120 of the tunable optical lens 100 of FIG. 1A. FIG. 1C is a diagram of a phase profile of the tunable optical lens 100 of FIG. 1A.

Referring to FIG. 1A, the tunable optical lens 100 according to an embodiment of the disclosure may include an electro-active material layer 150 and a control electrode 120 provided on one surface of the electro-active material layer 150.

An electro-active material of the electro-active material layer 150 may be configured such that a refractive index is changed depending on a voltage applied to the control electrode 120. An example of the electro-active material may include liquid crystal. For example, the electro-active material may include nematic liquid crystal, smectic liquid crystal, or cholesteric liquid crystal. In another example, polymer gel, electro-active polymer (EAP), liquid crystal polymer, polymer dispersed liquid crystal (PDLC), polymer stabilized liquid crystal (PSLC), and a self-assembled nonlinear supramolecular structure may be used as the electro-active material. The electro-active material may be appropriately selected considering requirements for a tunable optical lens such as a response time, an amount of a driving voltage, or a liquid crystal orientation control method.

In an embodiment, a common electrode 180 may be provided on a surface different from the surface where the control electrode 120 of the electro-active material layer 150 is provided. The control electrode 120 and the common electrode 180 may be provided on the same surface of the electro-active material layer 150 according an orientation method or electric field application method of the electro-active material layer 150.

A first substrate 110 and a second substrate 190 may be arranged to face each other with the electro-active material layer 150 therebetween. The first and second substrates 110 and 190 may include a transparent material such as glass, plastic, or quartz in a visible range, but the disclosure is not limited thereto. The thickness of each of the first and second substrates 110 and 190 may be in a range of, for example, 3 µm to 200 µm. The thicknesses of the first and second substrates 110 and 190 may be selected based on a substrate material.

The control electrode 120 may include a plurality of electrode components 121. The number or size of the electrode components 121 illustrated in FIG. 1A is provided as an example to help understanding of the disclosure, and may not directly one-to-one correspond to the pattern of the control electrode 120 of FIG. 1B or the shape of the phase profile of FIG. 1C. The control electrode 120 may be provided on a surface facing the second substrate 190 of the first substrate 110. In an embodiment, the control electrode 120 may be formed on one surface of the first substrate 110 in a single layer. In an embodiment, the control electrode 120 may be formed on one surface of the first substrate 110 in a multilayer of two or more layers. The common electrode 180 may be provided on a surface facing the first substrate 110 of the second substrate 190. According to an orientation method or an electric field application method of the electro-active material layer 150, the control electrode 120 and the common electrode 180 may be provided only on a substrate of any one of the first substrate 110 and the second substrate 190. An orientation film or an insulating film may be provided between the control electrode 120 and the electro-active material layer 150. Likewise, the orientation film or the insulating film may be provided between the common electrode 180 and the electro-active material layer 150. The electrode components 121 of the control electrode 120 or the common electrode 180 may include, for example, a transparent conductive material such as an indium-zinc oxide (IZO) or an indium-tin oxide (ITO), but the disclosure is not limited thereto. The thicknesses of the control electrode 120 and the common electrode 180 may be in a range of, for example, 30 nm to 200 nm. The thicknesses of the control electrode 120 and the common electrode 180 may be selected based on the materials thereof. For example, the thicknesses of the control electrode 120 and the common electrode 180 may be appropriately selected depending on the characteristics of an electrode material, for example, ITO, an indium oxide, a tin oxide, IZO, a zinc oxide, and the like.

In an embodiment, an aperture of the tunable optical lens 100 may be circular. In an embodiment, the electrode components 121 may have a concentric ring shape. In other words, the electrode components 121 of the control electrode 120 may be ring electrodes and arranged concentrically. The shape of a concentrically arranged ring may be the shape of one of the electrode components 121, and the shape of a different electrode component is possible as discussed below in detail.

The electrode components 121 of the control electrode 120 are configured to form at least two different diffraction zones. In an embodiment, the control electrode 120 may have two or more electrode patterns configured to generate different diffraction zones. The electrode components 121 of each electrode pattern are classified into groups corresponding to diffraction zones (a Fresnel zone).

In an embodiment, the control electrode 120, as illustrated in FIG. 1B, may include a first electrode pattern P1 and a second electrode pattern P2. The first electrode pattern P1 may be located inside a circular aperture, that is, at a central portion, and the second electrode pattern P2 may be located at the outside surrounding the first electrode pattern P1. Each of the first and second electrode patterns P1 and P2 may include one or more electrode groups. Each electrode group of the control electrode 120 may include a plurality of electrode components 121 of FIG. 1A. The electrode components 121 of the control electrode 120 are electrically connected to each other and to the outside by buses according to a certain method as described below. In an embodiment, each of the one or more electrode groups in the first electrode pattern P1 may include K electrode components, and each of the one or more electrode groups in the second electrode pattern P2 may include K/b electrode components. In this state, "b" is an integer indicating multiples, and the number of quantization levels is reduced by as many as the multiple b in the second electrode pattern P2, compared with the first electrode pattern P1. For example, when b is 2, each of the one or more electrode groups in the second electrode pattern P2 may include K/2 electrode components.

A phase profile generated in a diffraction zone of the first electrode pattern P1 may be different from a phase profile generated in a diffraction zone of the second electrode pattern P2. When the control electrode 120 has two electrode patterns as in the present embodiment, the tunable optical lens 100 may have at least two phase profiles in different areas. FIG. 1C is a diagram of an example of a phase profile formed in each diffraction zone provided from the first and second electrode patterns P1 and P2. Each diffraction zone may form one or a plurality of Fresnel zone(s) or a part of a Fresnel zone.

Focus tuning of the tunable optical lens 100 may be achieved by applying a voltage to the electrode components 121 through buses connecting the electrode components 121. When a voltage is applied to the electrode components 121, the electro-active material layer 150 of the tunable optical lens 100 is appropriately affected. For example, when liquid crystal is used as an electro-active material, that is, in a liquid crystal tunable lens, a voltage applied to each of the electrode components 121 changes a direction of liquid crystal, thereby changing a refractive index value. According to the disclosure, the control electrode 120 is substantially arranged on the entire surface, that is, an aperture, of the tunable optical lens 100, and a voltage profile corresponding to a specific phase profile is applied to each of the electrode components 121 of the control electrode 120. Due to a phase voltage dependency that is the characteristics of an optical active material, the voltage profile applied to each of the electrode components 121 is converted into an optical phase profile. In an embodiment, when a voltage is applied to the control electrode 120, at least two electrode patterns may generate at least two phase profiles.

The radius of each of the electrode components 121 having a ring shape of the first electrode pattern P1 may be calculated according to the following Equation 1.

$$r = \sqrt{2\left(m - 1 + \frac{k}{K}\right) \cdot \frac{\lambda h}{D}},$$ [Equation 1]

In Equation 1, "m" denotes a diffraction zone number. When only one diffraction zone is provided in the first electrode pattern P1, m=1. When a plurality of diffraction zones are provided in the first electrode pattern P1, the diffraction zone number is sequentially numbered from a center of a circular aperture. Each diffraction zone may include K electrode components. An electrode component k of a diffraction zone m is connected to a bus k. The electrode component k is a numbering of the electrode components 121 in each diffraction zone of the first electrode pattern P1, and the bus k is also a numbering of the buses provided in the tunable optical lens 100. k=1:K. In other words, k is a positive integer less than or equal to K. K is the number of the electrode components 121 in each diffraction zone of the first electrode pattern P1, and is also a total number of buses that are one-to-one connected to the electrode components 121. A denotes a wavelength of incident light and h denotes the height of a phase profile. The height h may be a multiple of $2\pi$ radian. D denotes a minimum optical power of a tunable optical lens. In an embodiment, light having a wavelength A may be light in a visible ray range. In an embodiment, light may also be an infrared or ultraviolet ray.

The second electrode pattern P2 is located subsequent to the first electrode pattern P1 in a radial direction. The second electrode pattern P2 begins from a position where the width of each of the electrode components 121 of the first electrode pattern P1 becomes less than (e.g., reaches) a technical limit of a minimum allowable interval between the electrode components 121 (in the present embodiment, between the electrode components in a ring shape with respect to a radial direction). The width of each of the electrode components 121 may be determined to be a difference in radius between the adjacent electrode components 121, considering the technical interval between the electrode components 121.

In an embodiment, in the second electrode pattern P2, the radius of the electrode components 121 in a ring shape may be calculated according to the following Equation 2.

$$r = \sqrt{2\left(m - 1 + \frac{k}{K}\right) \cdot \frac{\lambda 2h}{D}}.$$ [Equation 2]

In Equation 2, "m" is the number of diffraction zones sequentially numbered from a center of a circular aperture. k may denote the number of the electrode components 121 in each diffraction zone of the second electrode pattern P2. When b is 2 as in the above-described example, each electrode group(s) in the second electrode pattern P2 may include K/2 electrode components 121. The electrode components 121 of the second electrode pattern P2 may be enumerated using even numbers (or odd numbers) in each diffraction zone of the second electrode pattern P2. In this case, each of the electrode components 121 k is connected to a bus of the corresponding number k. In the second electrode pattern P2, electrode components 121 are enumerated such that k mod 2=0 when using even numbers or such that k mod 2=1 for odd numbers. Here, an operation "mod" represents the remainder of dividing one number by another. A total connection number between the electrode components 121 in the second electrode pattern P2 and buses is K/2 in each diffraction zone m.

In an embodiment, by satisfying Equations 1 and 2, a tunable optical lens may be implemented, in which, for example, a lens aperture diameter is 30 mm, a maximum 3D optical power is achieved, and a technical limit of the width of each of electrode components is 3 μm or more.

Although a case in which the aperture of the tunable optical lens 100 is circular and the electrode components 121 has a ring shape and concentrically arranged is mainly described in the present embodiment, the shape of the aperture or the shape or arrangement of the electrode components 121 of the tunable optical lens 100 is not limited thereto.

Figure 2A:
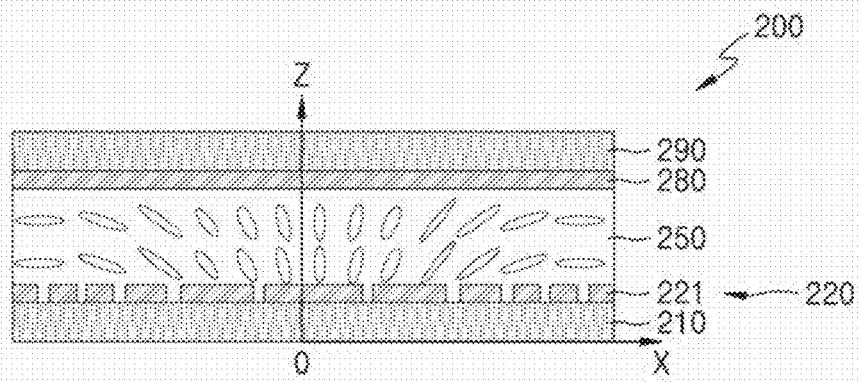
FIG. 2A is a schematic side cross-sectional view of a tunable optical lens according to an embodiment.
Figure 2B:
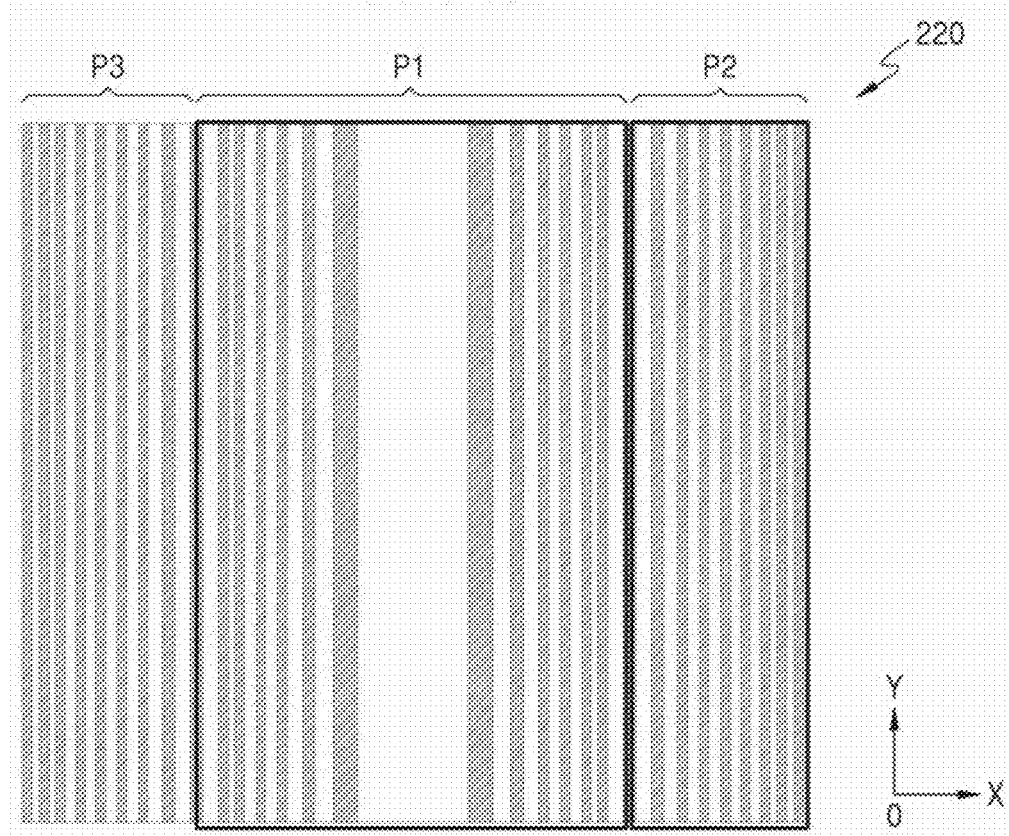
FIG. 2B is a diagram of a control electrode of the tunable optical lens of FIG. 2A.
Figure 2C:
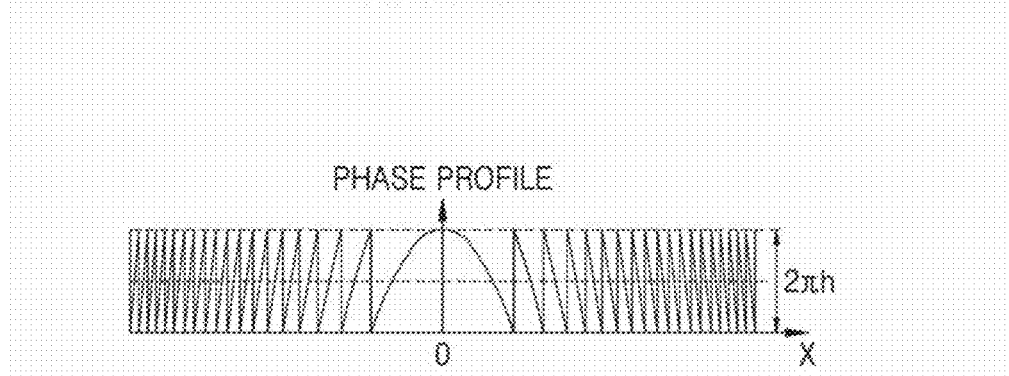
FIG. 2C is a diagram of a phase profile of the tunable optical lens of FIG. 2A.

FIGS. 2A to 2C are diagrams of a control electrode 220 including the first and second electrode patterns P1 and P2, each having linear (stripe) electrode components, in a tunable optical lens 200 according to an embodiment of the disclosure. FIG. 2A is a schematic side cross-sectional view of the tunable optical lens 200 according to an embodiment of the disclosure. FIG. 2B is a diagram of the control electrode 220 of the tunable optical lens 200 of FIG. 2A. FIG. 2C is a diagram of a phase profile of the tunable optical lens 200 of FIG. 2A.

Referring to FIGS. 2A to 2C, the tunable optical lens 200 according to an embodiment of the disclosure may include an electro-active material layer 250 and the control electrode 220 provided on one surface of the electro-active material layer 250. A first substrate 210 and a second substrate 290 may be arranged to face each other with the electro-active material layer 250 therebetween. The common electrode 280 may be provided on the other surface of the electro-active material layer 250, but the disclosure is not limited thereto.

The control electrode 220 may include a plurality of the electrode components 221. The number or size of the electrode components 221 illustrated in FIG. 2A is provided as an example to help understanding of the disclosure, and may not directly one-to-one correspond to the pattern of the control electrode 220 of FIG. 2B or the shape of the phase profile of FIG. 2C.

In an embodiment, the tunable optical lens 200 may have a rectangular aperture, the electrode components 221 of the control electrode 220 may have a stripe shape in a direction extending along one axis, and may be configured to form at least two different diffraction zones. In an embodiment, the control electrode 220 may have two or more electrode patterns configured to generate different diffraction zones. In an embodiment, with respect to an X axis, the first electrode pattern P1 is located at a center of a lens aperture, and the second electrode pattern P2 is located at both sides of the first electrode pattern P1. Each of the first and second electrode patterns P1 and P2 may include one or more electrode groups, and each electrode group may include electrode components having a stripe shape in a direction extending along a Y axis. The tunable optical lens 200 of the present embodiment has a refractive power in the X-axis direction, but no refractive power in the Y-axis direction. Accordingly, as illustrated in FIG. 2C, a phase profile of the tunable optical lens 200 is set with respect to the X-axis direction.

The aperture shape of the tunable optical lens 200 is not limited to the above-described embodiments. The tunable optical lens 200 may have an aperture shape such as a rectangular shape, a polygonal shape, a curved shape, or any other appropriate aperture shape. The lens aperture of the tunable optical lens 200 may have a shape defined by actual requirements regarding an optical system, a size limit, necessary shape and size of an electrode (element), and the like. The electrode components may have an irregular shape other than a ring shape, a stripe shape, a polygonal shape, and the like. For example, the selection of an electrode shape may be related to the type of a tunable optical lens. For example, concentric ring electrode components may be used to form a spherical tunable optical lens in which the transmittance does not depend on the polarization of incident light. Alternatively, in order to simplify a manufacturing process or focus only in one-axis direction as in a cylindrical lens, electrode components in a stripe shape arranged in parallel may be used.

Figure 3A:
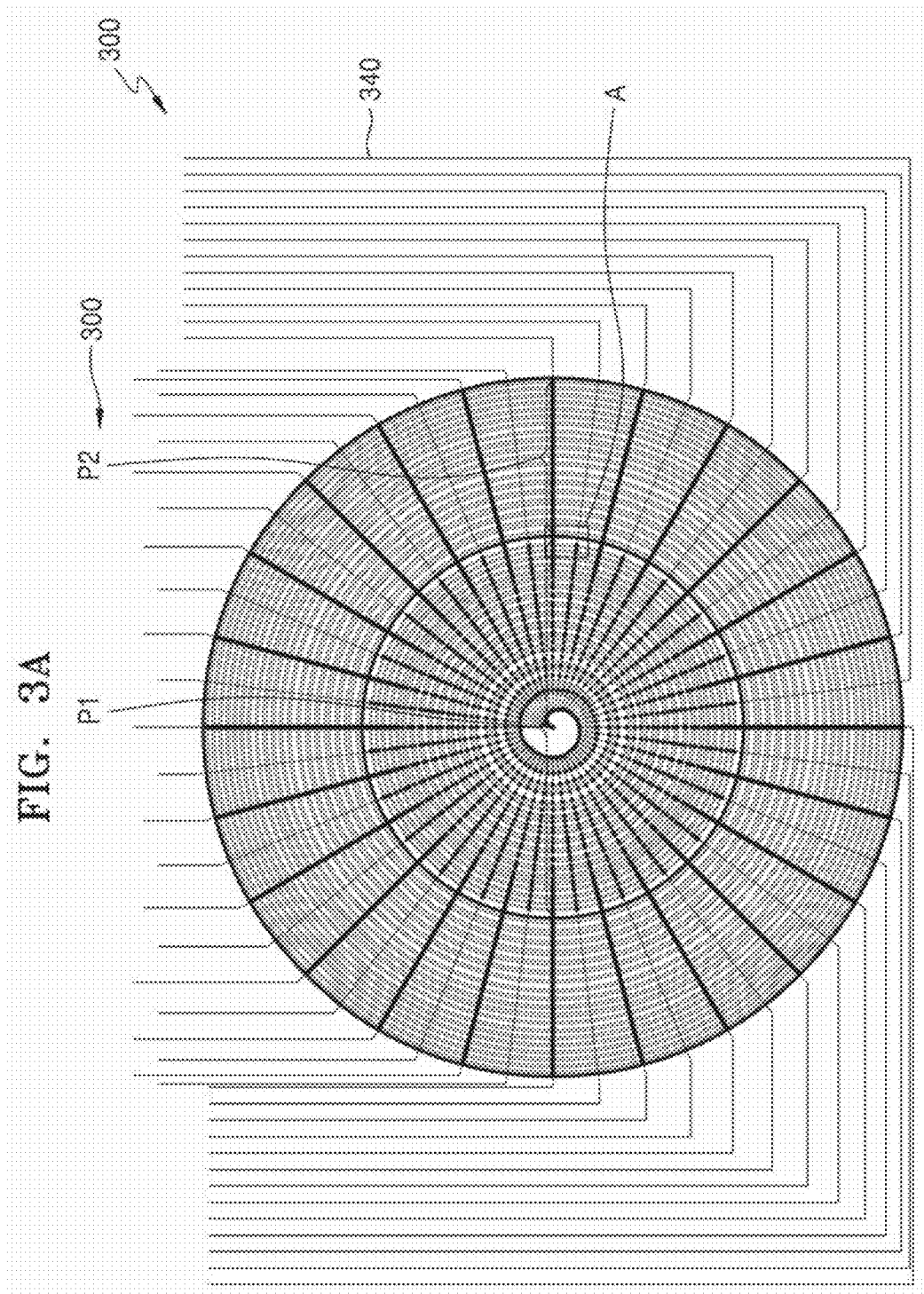
FIG. 3A is a schematic diagram of a connection between buses and electrode components of a control electrode of a tunable optical lens according to an embodiment.
Figure 3C:
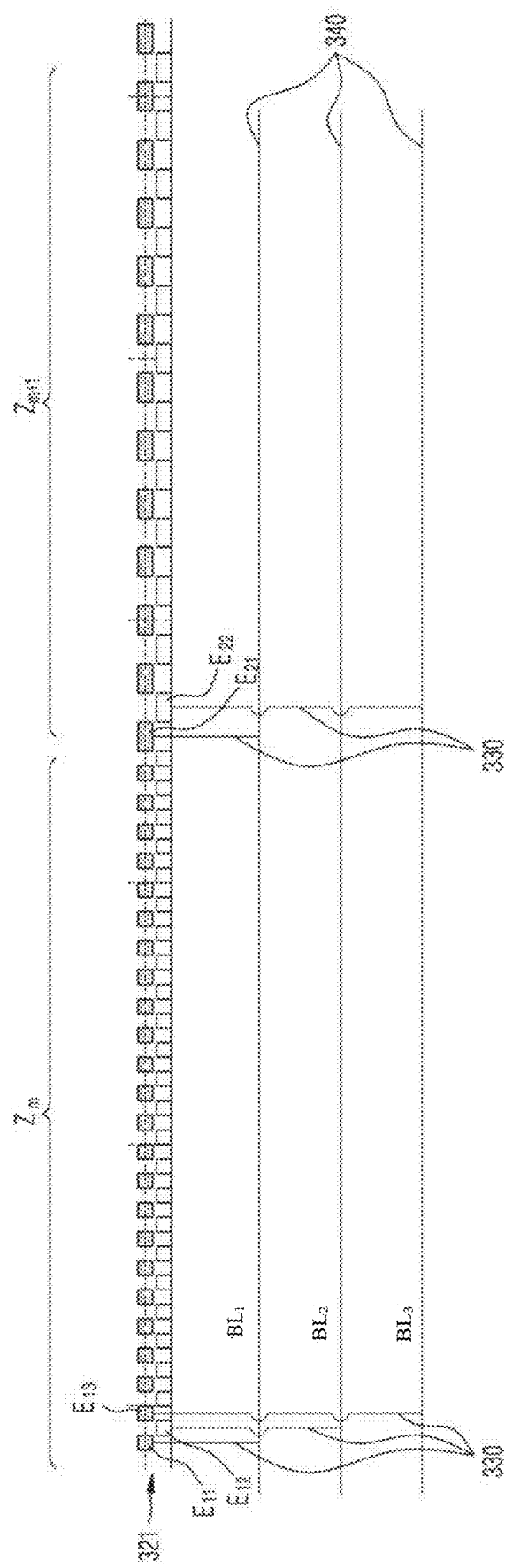
FIG. 3C is a diagram of a method of connecting electrode components to buses in FIG. 3B.

A tunable optical lens 300 according to an embodiment of the disclosure is described below with reference to FIGS. 3A to 3C. FIG. 3A is a schematic diagram of a connection between buses 340 and electrode components (321 in FIG. 3B) of a control electrode 320 of the tunable optical lens 300, according to an embodiment of the disclosure. FIG. 3B is an enlarged view of an area A of FIG. 3A, illustrating an adjacent portion of the first and second electrode patterns P1 and P2. FIG. 3C is a diagram of a method of connecting the electrode components 321 to the buses 340 in FIG. 3B.

Referring to FIGS. 3A to 3C, the control electrode 320 may include the first and second electrode patterns P1 and P2. The first electrode pattern P1 and the second electrode pattern P2 are provided adjacent to each other. Each of the first and second electrode patterns P1 and P2 include the electrode components 321 in the shape of a plurality of rings. The electrode components 321 of each of the first and second electrode patterns P1 and P2 may be grouped into one or a plurality of electrode groups. Each electrode group may form a diffraction zone. In other words, each of the first and second electrode patterns P1 and P2 may include one or a plurality of diffraction zones. In FIG. 3B, the electrode components 321 are shown to be hatched to distinguish the electrode groups, that is, diffraction zones, which has no physical meaning. Each of diffraction zones including the electrode components 321 in a ring shape is circular.

The electrode components 321 are connected to the buses 340 through a via hole 330 or other similar means (see, e.g., FIG. 3C).

The buses 340 may include the same material as the electrode components 321. For example, the buses 340 may include a transparent conductive material in a visible range, such as ITO, an indium oxide, a tin oxide, IZO, a zinc oxide, and the like. The material of the buses 340 is not limited to a transparent material, and may include an appropriate material including a non-transparent material in a visible range. For example, the buses 340 may include a conductive material such as Ag, Mo, Ni, and the like.

The first and second electrode patterns P1 and P2 are connected to the buses 340 in a specific order. The buses 340 are configured to extend outside an effective aperture of the tunable optical lens 300 to be electrically connected to a driving circuit.

For example, the first electrode pattern P1 may include m diffraction zones. In FIG. 3B, $Z_m$ denotes m-th diffraction zone of the first electrode pattern P1 from a central portion. From the entire view of the control electrode 320, a first diffraction zone of the second electrode pattern P2 may be a (m+1)th diffraction zone from the central portion. In other words, $Z_{m+1}$ denotes a first diffraction zone of the second electrode pattern P2. The (m+1)th diffraction zone $Z_{m+1}$ is located closest to the m-th diffraction zone $Z_m$.

Each diffraction zone of the first electrode pattern P1 has K electrode components as the electrode components 321, and each diffraction zone of the second electrode pattern P2 subsequent to the first electrode pattern P1 has K/2 electrode components as the electrode components 321 according to a rule described below. For example, the m-th diffraction zone $Z_m$ includes K electrode components as the electrode components 321, and the (m+1)th diffraction zone $Z_{m+1}$ includes K/2 electrode components as the electrode components 321. For example, FIG. 3C is a diagram of a case in which the m-th diffraction zone $Z_m$ includes forty-eight (48) electrode components as the electrode components 321 and the (m+1)th diffraction zone $Z_{m+1}$ includes twenty-four (24) electrode components as the electrode components 321. FIG. 3C is a diagram of an example in which the electrode components 321 include two layers, but the disclosure is not limited thereto. The electrode components 321 may include a single layer or three or more layers. In FIG. 3C, $E_{11}$ denotes a first electrode component of the first electrode pattern P1, $E_{12}$ denotes a second electrode component of the first electrode pattern P1, and $E_{13}$ denotes a third electrode component of the first electrode pattern P1. Likewise, $E_{21}$ denotes a first electrode component of the second electrode pattern P2, and $E_{22}$ denotes a second electrode component of the second electrode pattern P2.

The number of the buses 340 is the same as the number of the electrode components 321 of each diffraction zone of the first electrode pattern P1. For example, the buses 340 may include K buses. In FIG. 3C, for example, three of the buses 340 are indicated by bus lines $BL_1$, $BL_2$, and $BL_3$. In the m-th diffraction zone $Z_m$ of the first electrode pattern P1, the first electrode component $E_{11}$ is connected to a first bus line $BL_1$, the second electrode component $E_{12}$ is connected to a second bus line $BL_2$, and the third electrode component $E_{13}$ is connected to a third bus line $BL_3$. In the (m+1)th diffraction zone $Z_{m+1}$, that is, the first diffraction zone, of the second electrode pattern P2, the first electrode component $E_{21}$ is connected to the first bus line $BL_1$, and the second electrode component $E_{22}$ is connected to the third bus line $BL_3$. As a result, the electrode components 321 of the second electrode pattern P2 are connected to odd-numbered bus lines among the buses 340. In FIG. 3B, on a k-th bus line $BL_k$, the via hole 330 is located one for each diffraction zone of the first and second electrode patterns P1 and P2, and, on a (k+1)th bus line $BL_{k+1}$, the via hole 330 is located one for each diffraction zone of the first electrode pattern P1, but none in the diffraction zones of the second electrode pattern P2. This means that k-th electrode components are connected to the k-th bus line $BL_k$ in each diffraction zone of the first and second electrode patterns P1 and P2, and (k+1)th electrode components are connected to the (k+1)th bus line $BL_{k+1}$ in each diffraction zone of the first electrode pattern P1, but the electrode components in each diffraction zone of the second electrode pattern P2 are not connected to the (k+1)th bus line $BL_{k+1}$.

The diffraction efficiency of the tunable optical lens 300 varies depending on the number of quantization levels of a phase profile. The number of quantization levels varies depending on the number of the buses 340 and the number of the electrode components 321. In the tunable optical lens 300, the more the number of buses and the electrode components 321 of the control electrode 320, the higher the diffraction efficiency of the tunable optical lens 300. In a wiring/interconnection method according to the present embodiment of the disclosure, as many as possible of the electrode components are provided in the diffraction zones of the first electrode pattern P1 located at a central portion of an aperture of the tunable optical lens 300, thereby implementing the highest number of quantization levels and the highest level of image quality, and simultaneously, the number of the electrode components in the diffraction zone of the second electrode pattern P2 located outside the aperture of the tunable optical lens 300 is reduced, thereby facilitating manufacturing.

Although the above-described embodiment describes, as an example, a case in which the control electrode 320 is divided into two electrode patterns, the disclosure is not limited thereto. In an embodiment, the control electrode 320 may have P electrode patterns. In this case, the P electrode patterns may be assigned to be the first electrode pattern P1, the second electrode pattern P2, . . . , and the P-th electrode pattern, in order from the central portion of the tunable optical lens 300 to the outside. A p-th electrode pattern is referred to as an electrode pattern p or an electrode pattern of a number p. P is an integer of two or more, and p is a positive integer of P or less.

An individual electrode group in the first electrode pattern P1 may include K electrode components, an individual electrode group in a p-th electrode pattern may include $K/b^{p-1}$ electrode components, and an individual electrode group of a subsequent electrode pattern, that is, a (p+1)th electrode pattern, may include $K/b^p$ electrode components. This clarifies how the number of electrode components in an individual electrode group of a subsequent electrode pattern decreases with respect to the number of electrode components in an individual electrode group of a given electrode pattern. For example, each diffraction zone of the first electrode pattern P1 includes K electrode components. K may be understood as the number of buses in a tunable optical lens. When b=2, each diffraction zone of the second electrode pattern P2 includes K/2 electrode components, and a diffraction zone of an electrode pattern number P includes $K/2^{P-1}$ electrode components. When the first electrode pattern P1 includes a plurality of electrode groups, in the first electrode pattern P1, electrode components of any one electrode group are connected to electrode components of another electrode group by K buses. Among the buses connecting the electrode components of the first electrode pattern P1, $b^{p-1}$ buses connect electrode components in each electrode group in the p-th electrode pattern. In other words, each electrode group in the p-th electrode pattern includes $K/b^{p-1}$ electrode components, and the electrode components are connected to each other by $K/b^{p-1}$ buses. When a voltage is applied to buses and accordingly the voltage is applied to a control electrode, two or more phase profiles are formed through the electrode pattern. The number of quantization levels of a phase profile decrease in each subsequent electrode pattern. In other words, the number of quantization levels with respect to a phase profile due to a diffraction zone(s) of the p-th electrode pattern is $b^{p-1}$ times less than the number of quantization levels with respect to a phase profile due to a diffraction zone(s) of the first electrode pattern.

In an embodiment, a radius $r_{pmk}$ of electrode components of the electrode pattern p of the control electrode may be calculated according to Equation 3 below:

$$r_{pmk} = \sqrt{A_p \cdot 2\left(m_p - 1 + \frac{k}{K}\right) \cdot \frac{\lambda h}{D}},$$ [Equation 3]

In Equation 3, $A_p$ is an integer indicating a minimal possible maximal phase difference in the electrode pattern p. $m_p$ is a diffraction zone number of the electrode pattern p. A diffraction zone number $m_p$ is sequentially numbered to be 1, 2, 3, . . . from a central portion of a lens. A denotes a wavelength of incident light, and h denotes a height of a phase profile generated by a multiple of $2\pi$ radian. D is a minimum optical power (unit diopter) of a tunable lens.

An electrode component number k is connected to a bus number k. The electrode component k is a numbering of electrode components in each diffraction zone of the electrode pattern p. In this state, k may be a positive integer satisfying that k mod $b^{p-1}$=a, and a may be any one integer of 0, 1, . . . , $b^{p-1}$−1. For example, when b=2, in each diffraction zone of the second electrode pattern, the electrode components 121 may be enumerated using even numbers or odd numbers. In another example, when b=3, in each diffraction zone of the second electrode pattern, the electrode components 121 may be enumerated using multiples of 3.

An electrode pattern p+1 is located subsequent to the electrode pattern p with respect to a radial direction. When, in the electrode pattern p, a radial difference of adjacent electrode components 121 decreases to be less than a technical limit, the electrode pattern p+1 begins with the subsequent diffraction zone. In other words, the electrode pattern p+1 begins where the width of the electrode components 121 of the electrode pattern p becomes less than a technical limit with respect to a minimum allowable interval between the electrode components 121. A relationship between $A_p$ and $m_p$ in the electrode pattern p and $A_{p+1}$ and $m_{p+1}$ in the electrode pattern p+1 may satisfy Equation 4 below.

$$m_{p+1} = \frac{A_p}{A_{p+1}}(m_p - 1) + \frac{k}{K}\left(\frac{A_p}{A_{p+1}} - 1\right) + 1.$$ [Equation 4]

Figure 4:
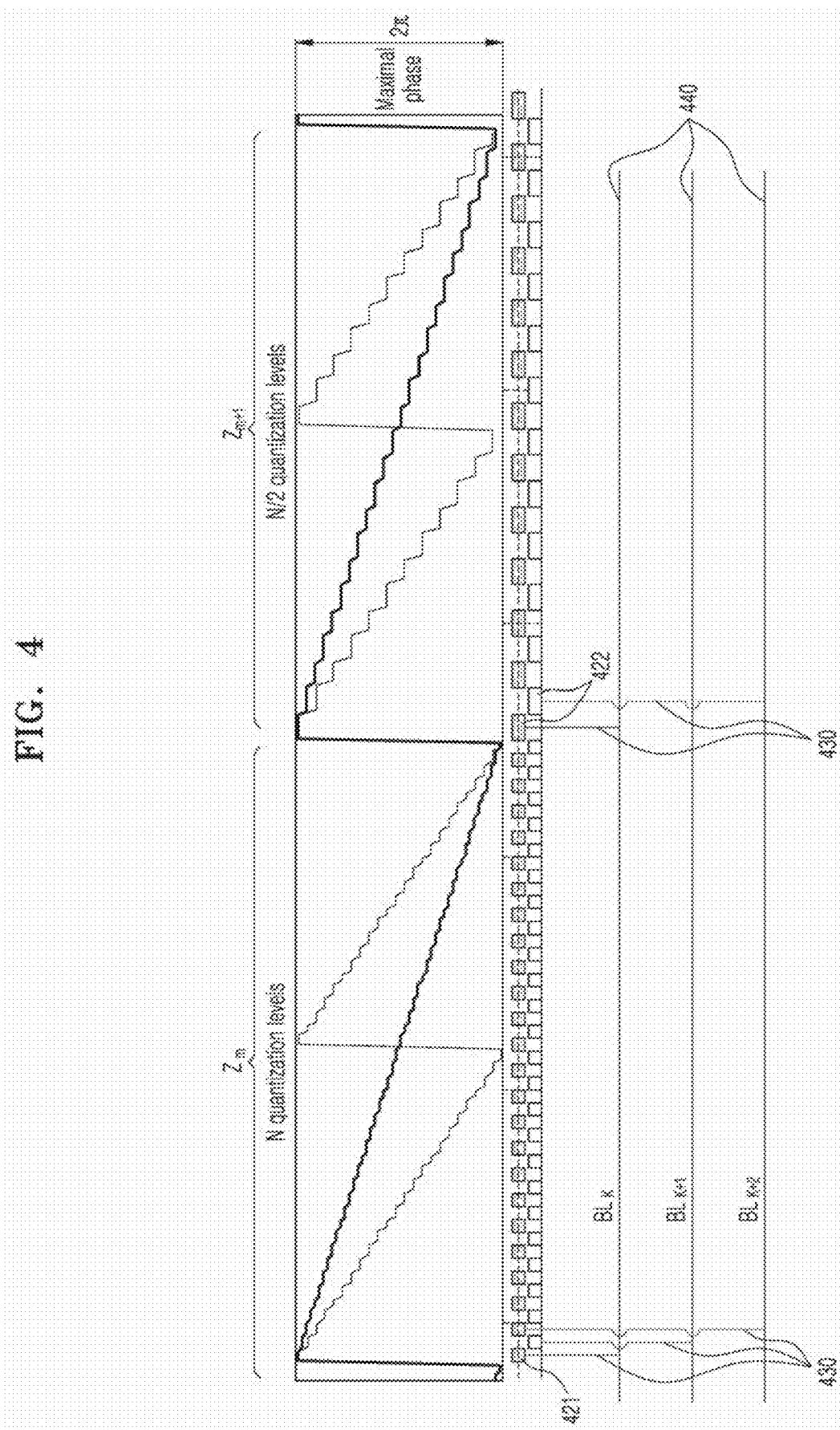
FIG. 4 is a diagram of two phase profiles corresponding to different optical powers in a tunable optical lens according to an embodiment.

FIG. 4 is a diagram of two phase profiles corresponding to different optical powers in a tunable optical lens according to an embodiment of the disclosure.

As shown in FIG. 4, an m-th diffraction zone $Z_m$ and an (m+1)th diffraction zone $Z_{m+1}$ adjacent to each other belong to different electrode patterns. In other words, the m-th diffraction zone $Z_m$ may have N electrode components 421, and the (m+1)th diffraction zone $Z_{m+1}$ may have N/2 electrode components 422 (when b=2). When a voltage is applied to the electrode components 421 and 422 through buses 440, a refractive index value of an electro-active material layer of a tunable optical lens is changed, and thus the change of the refractive index value of the electro-active material layer may make a delay in the phase of light that passes through the electro-active material layer. Accordingly, a phase profile is generated corresponding to a voltage profile applied to the electrode components 421 and 422. The N electrode components 421 may quantize a maximal phase $2\pi h$ to an N level in a tunable optical lens. The height of each quantization level may be equal, but the disclosure is not limited thereto. The number of quantization levels of a phase profile decrease in each subsequent electrode pattern. In other words, the number of quantization levels with respect to a phase profile due to the diffraction zone(s) of the p-th electrode pattern is $b^{p-1}$ times less than the number of quantization levels with respect to a phase profile due to the diffraction zone(s) of the first electrode pattern. For example, as illustrated in FIG. 4, a phase profile in the m-th diffraction zone $Z_m$ may have a quantization level N, and a phase profile in the (m+1)th diffraction zone $Z_{m+1}$ may have a quantization level N/2 (when b=2). The shape of a phase profile may vary according to the voltage profile applied to the electrode components 421 and 422. For example, as indicated by a thick line in FIG. 4, a phase profile of one saw-toothed shape may be formed in each diffraction zone, or as indicated by a thin line, a phase profile of two saw-toothed shapes may be formed in each diffraction zone.

One technical problem related to the design of the aperture of a large tunable optical lens, for example, having a diameter of 20 mm or more, is that an electrode component at an edge of a lens has a too small size, in particular, too small width. When at least two phase profiles having different quantization levels are generated, that is, a relatively large number of quantization levels in a central area and a relatively small number of quantization levels in a peripheral area are provided, the size of an electrode component at the edge of a tunable optical lens may be increased. In this case, a diffraction efficiency η of a central area (the most important characteristics to provide a realistic impression of a virtual object image) of a tunable optical lens may be high. The diffraction efficiency is proportional to the number of a quantization level N and calculated by using the following equation.

$$\eta \sim sinc^2\left(\frac{1}{N}\right) \quad \text{[Equation 5]}$$

In Equation 5, sinc(x)=sin(πx)/(πx).

Referring back to FIG. 4, in the embodiment of FIG. 4, it may be seen that, to control two phase profiles through the same buses 440, the two phase profiles have the same maximal phase and the same quantization level.

Figure 5:
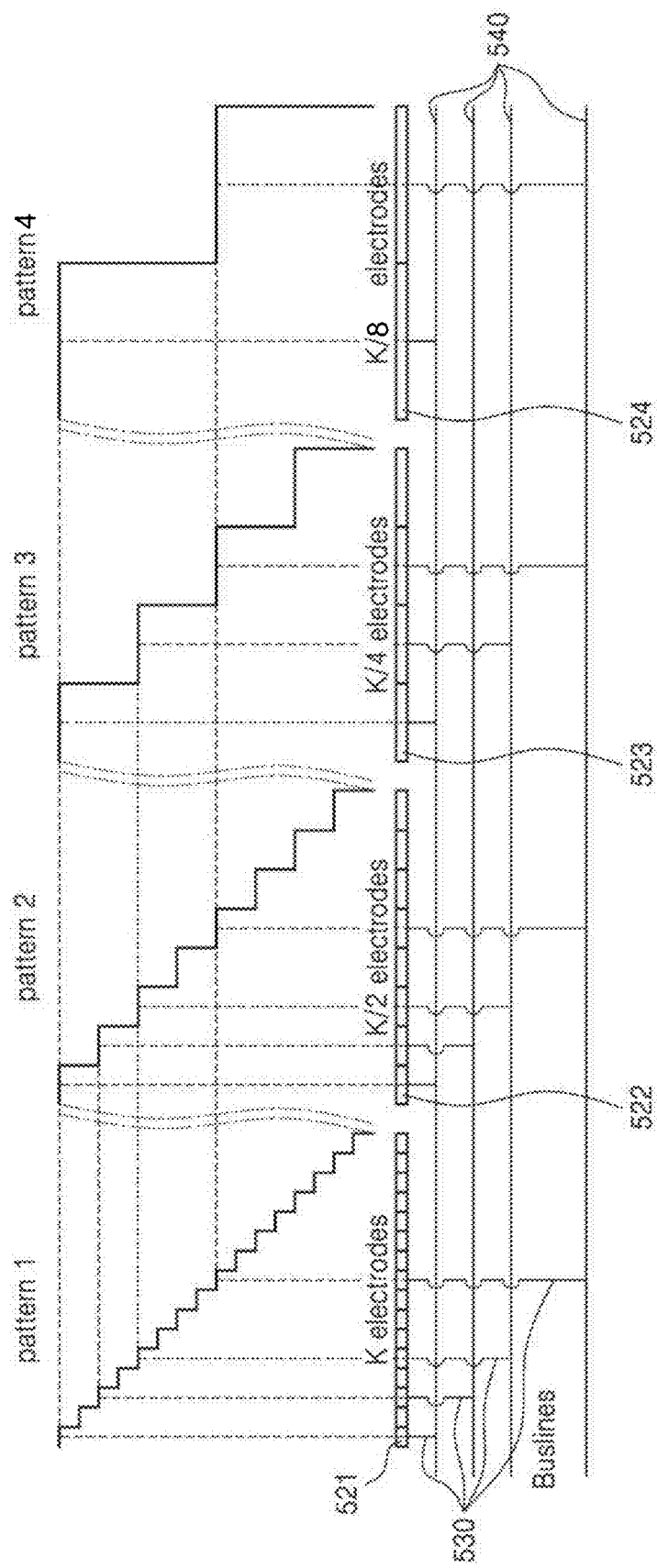
FIG. 5 is a diagram of a connection between electrode components of a control electrode and buses, sizes of electrode components, and a quantization level of each of four electrode patterns, when a tunable optical lens according to an embodiment includes a control electrode having four electrode patterns.

In an embodiment, the number of electrode patterns may exceed 2, that is, for example, p electrode patterns. FIG. 5 is a diagram of a connection between the electrode components 521 and the buses 540, sizes of the electrode components 521, and a quantization level of each of four electrode patterns, when a control electrode of a tunable optical lens according to an embodiment of the disclosure has four electrode patterns (p=4 and b=2). Referring to FIG. 5, it may be seen that the number of the electrode components 521 of a first electrode pattern is K, the number of electrode components 522 of a second electrode pattern is K/2, the number of electrode components 523 of a third electrode pattern is K/4, and the number of electrode components 524 of a fourth electrode pattern is K/8. A reference numeral 530 denotes wiring/interconnections like a via hole connecting the electrode components 521 to the buses 540. In the embodiment, the widths of the electrode components 521 increase from the first electrode pattern (arranged close to the center of a tunable optical lens aperture) to the fourth electrode pattern, and a given number of the electrode components 521 decreases as the widths of the electrode components 521 increase. Accordingly, a maximum number of quantization levels may be implemented, and thus the highest image quality may be implemented in the central area of a tunable optical lens corresponding to the first electrode pattern. In the above embodiment, the number of quantization levels in each subsequent electrode pattern is reduced by half. The above configuration may increase the diameter of a tunable optical lens, and accordingly, the tunable optical lens may be used in an application field needing, for example, a large lens aperture diameter, for example, vehicle head-up displays.

Figure 6:
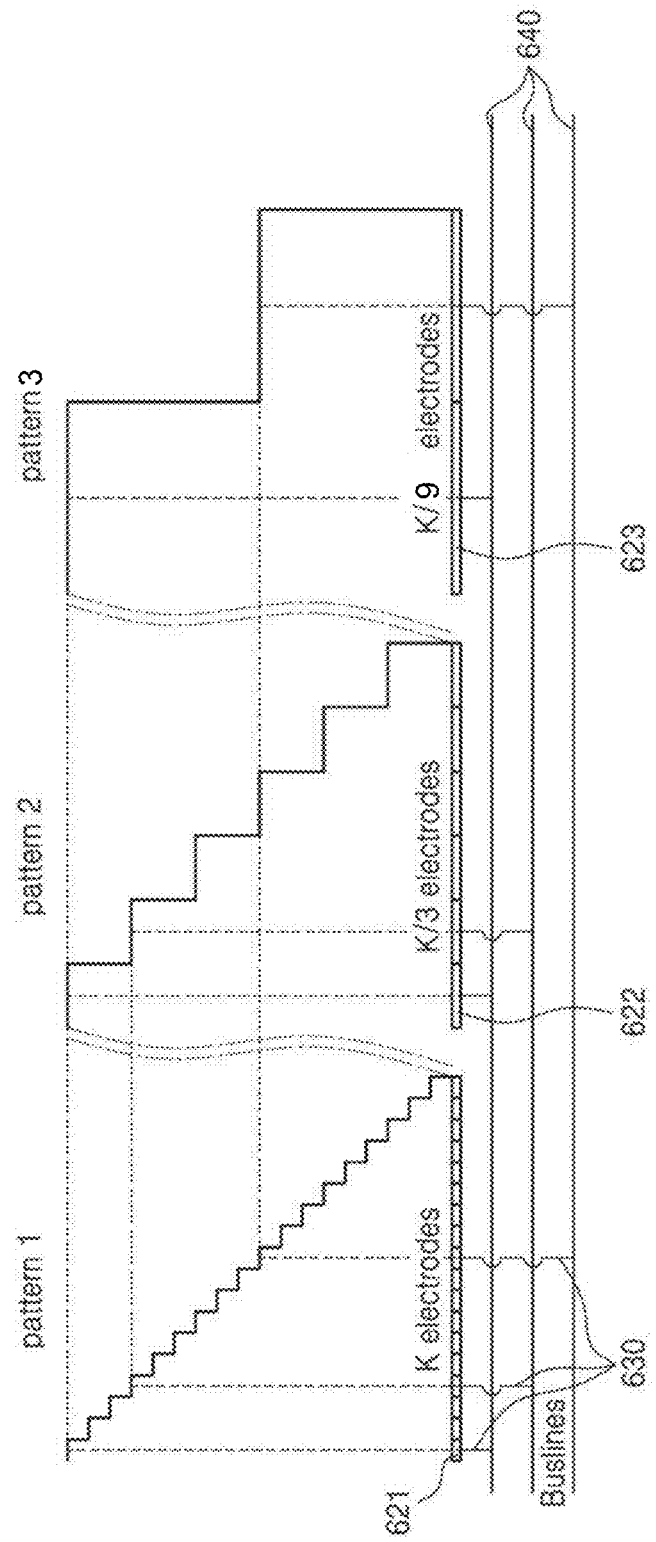
FIG. 6 is a diagram of a connection between electrode components of a control electrode and buses, sizes of electrode components, and a quantization level of each of three electrode patterns, when a tunable optical lens according to an embodiment includes a control electrode having three electrode patterns.

FIG. 6 is a diagram of a connection between electrode components 621 and buses 640, sizes of electrode components 621, and a quantization level of each of three electrode patterns, when a tunable optical lens according to an embodiment of the disclosure has three electrode patterns (p=3 and b=3).

Referring to FIG. 6, a control electrode of a tunable optical lens includes three electrode patterns, and the number of quantization levels in each subsequent electrode pattern is reduced by ⅓. In other words, it may be seen that the number of the electrode components 621 of a first electrode pattern is K, the number of electrode components 622 of a second electrode pattern is K/3, and the number of electrode components 623 of a third electrode pattern is K/9. Accordingly, it may be seen that the tunable optical lens has at least three different phase profiles. A reference numeral 630 denotes wiring/interconnections like a via hole connecting the electrode components 621 to the buses 640. In the embodiment, the number of connections is reduced in the design of a tunable optical lens, and thus manufacturing may be simplified.

Figure 7:
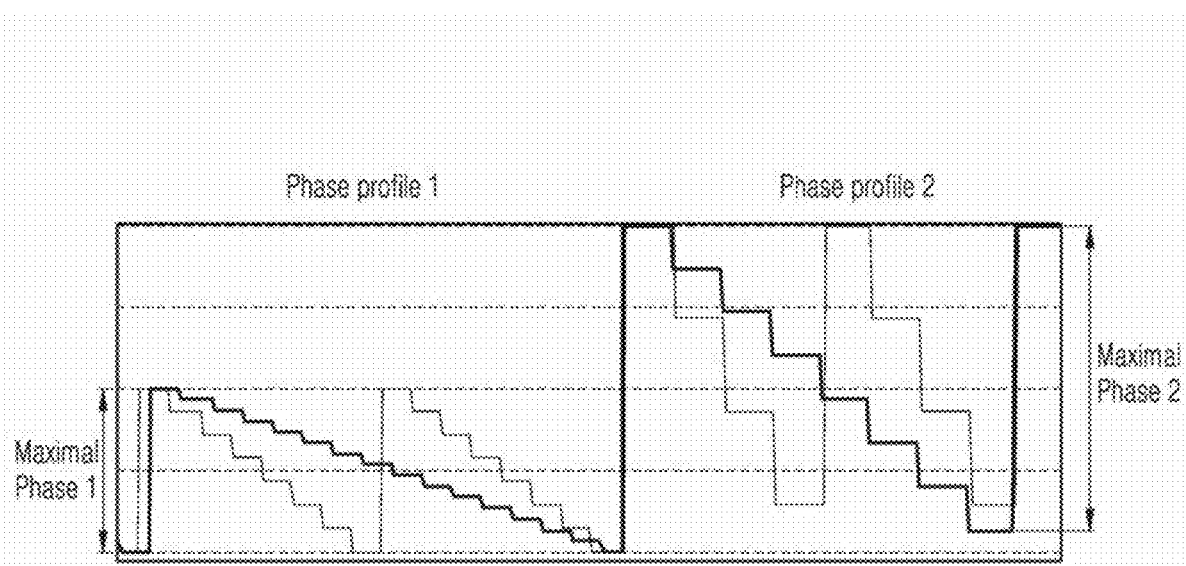
FIG. 7 is a diagram of a case in which a tunable optical lens according to an embodiment has different maximal phase values with respect to two adjacent phase profiles.

FIG. 7 is a diagram of a case in which a tunable optical lens according to an embodiment of the disclosure has different maximal phase values with respect to two adjacent phase profiles. Referring to FIG. 7, in a tunable optical lens according to an embodiment of the disclosure, different electrode patterns included in a control electrode generate phase profiles having different maximal phases. In other words, as illustrated in FIG. 7, maximal phase 1 of phase profile 1 generated by any one electrode pattern may not be identical to maximal phase 2 of phase profile 2 generated by another electrode pattern. In an example of FIG. 7, the maximal phase of phase profile 2 is greater than the maximal phase of phase profile 1. The above embodiment additionally provides the tunable optical lens with a merit of enabling a compensation for chromatic aberration.

Figure 8:
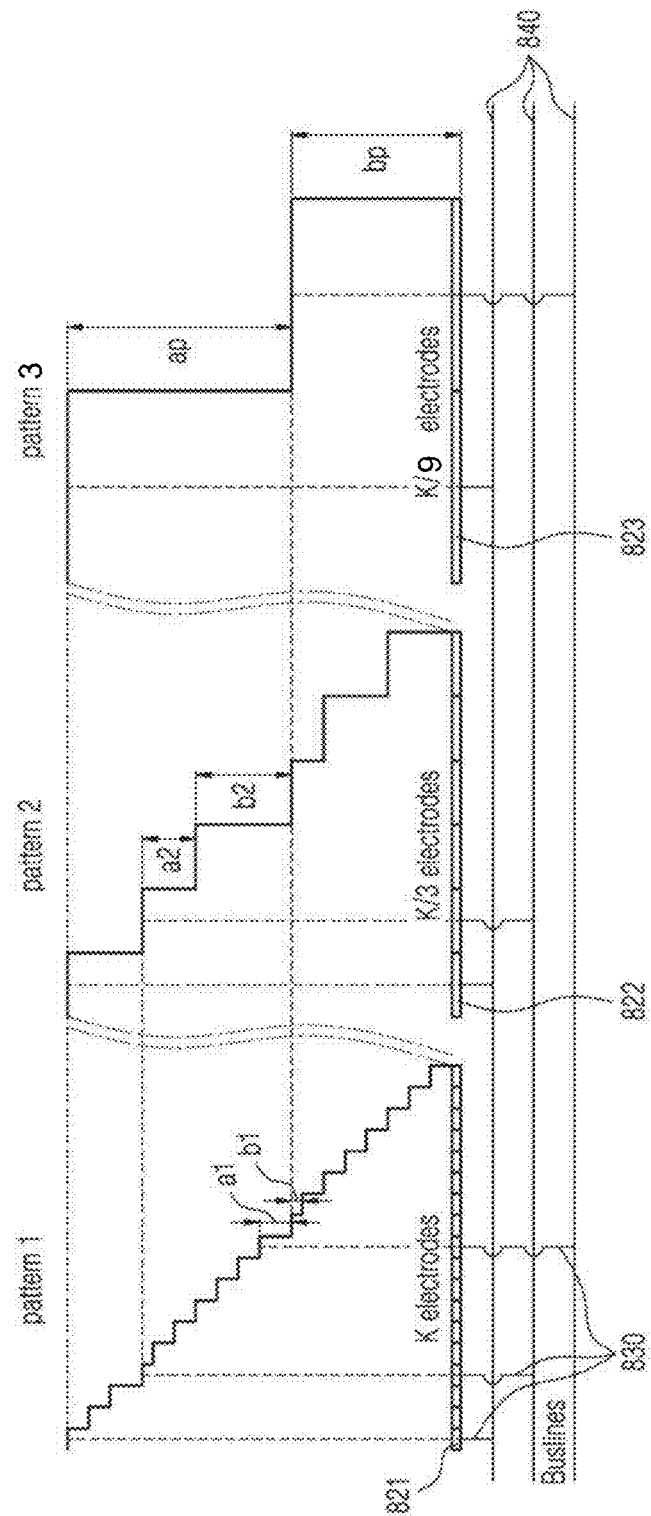
FIG. 8 is a diagram of a case in which the heights of quantization levels are not the same, when a tunable optical lens according to an embodiment includes a control electrode having three electrode patterns.

FIG. 8 is a diagram of a case in which the heights of quantization levels are not the same, when a tunable optical lens according to an embodiment of the disclosure has three electrode patterns (p=3 and b=3).

Referring to FIG. 8, the control electrode of the tunable optical lens includes three electrode patterns, and the number of quantization levels in each subsequent electrode pattern is reduced by ⅓. In this state, a phase profile generated in K electrode components 821 in a first electrode pattern (pattern 1) may have K quantization levels, and at least two heights a1 and b1 between adjacent ones of the quantization levels may not be the same (a1≠b1). Likewise, a phase profile generated in K/3 electrode components 822 in a second electrode pattern (pattern 2) may have K/3 quantization levels, and at least two heights a2 and b2 between adjacent ones of the quantization levels may not be the same (a2≠b2). A phase profile generated in K/9 electrode components 823 in a third electrode pattern (pattern p) may have K/9 quantization levels, and at least two heights a3 and b3 between adjacent ones of the quantization levels may not be the same (a3≠b3). The electrode components 821, 822, and 823 are electrically connected to buses 840 through wiring/interconnections 830 like a via hole. The present embodiment may provide a possibility of using electrode components having the same size (width) with respect to each electrode pattern.

Figure 9:
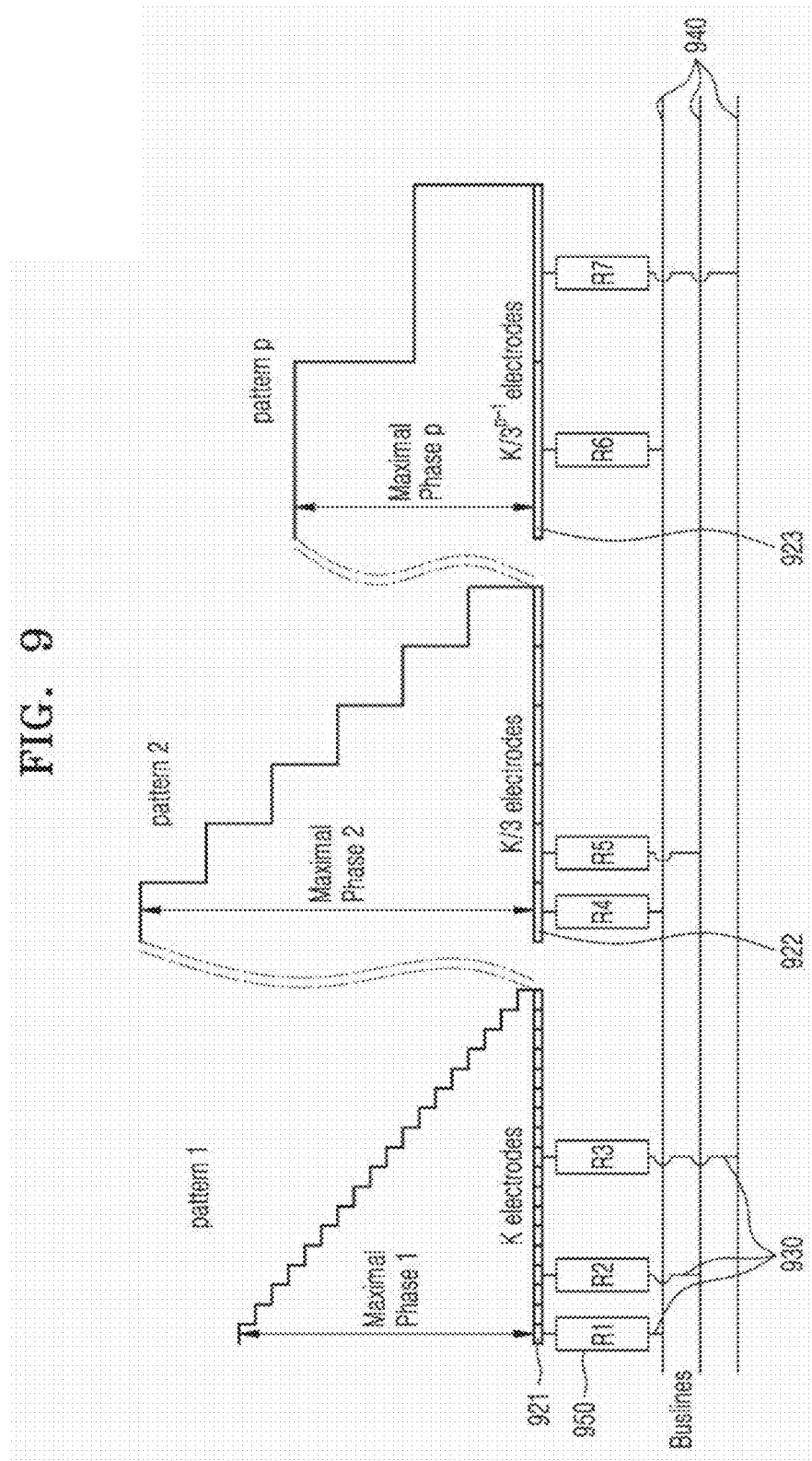
FIG. 9 is a diagram of a case in which circuit components are additionally connected between electrode components and buses, when a tunable optical lens according to an embodiment includes a control electrode having three electrode patterns.

FIG. 9 is a diagram of a case in which circuit components 950 are additionally connected between buses 940 and electrode components 921, 922, and 923, when a tunable optical lens according to an embodiment of the disclosure has three electrode patterns (p=3 and b=3).

Referring to FIG. 9, the control electrode of the tunable optical lens includes three electrode patterns, and three electrode patterns generate at least three phase profiles having different maximal phases. In this state, the circuit component 950 may be provided for at least one of the electrode components 921, 922, and 923 of the electrode patterns. The circuit component 950 is positioned within wiring/interconnections 930 connecting to buses 940. For example, as resistors R1, R2, . . . , R7 are provided as the circuit component 950, different maximal phases may be obtained with respect to different phase profiles, or the heights of quantization levels of phase profiles may be changed. Furthermore, as capacitors, inductors, diodes, and the like may be arranged as the circuit component 950 in addition to resistors, the electrical characteristics of a circuit, such as a response time or an optimal frequency, may be further improved.

Figure 10:
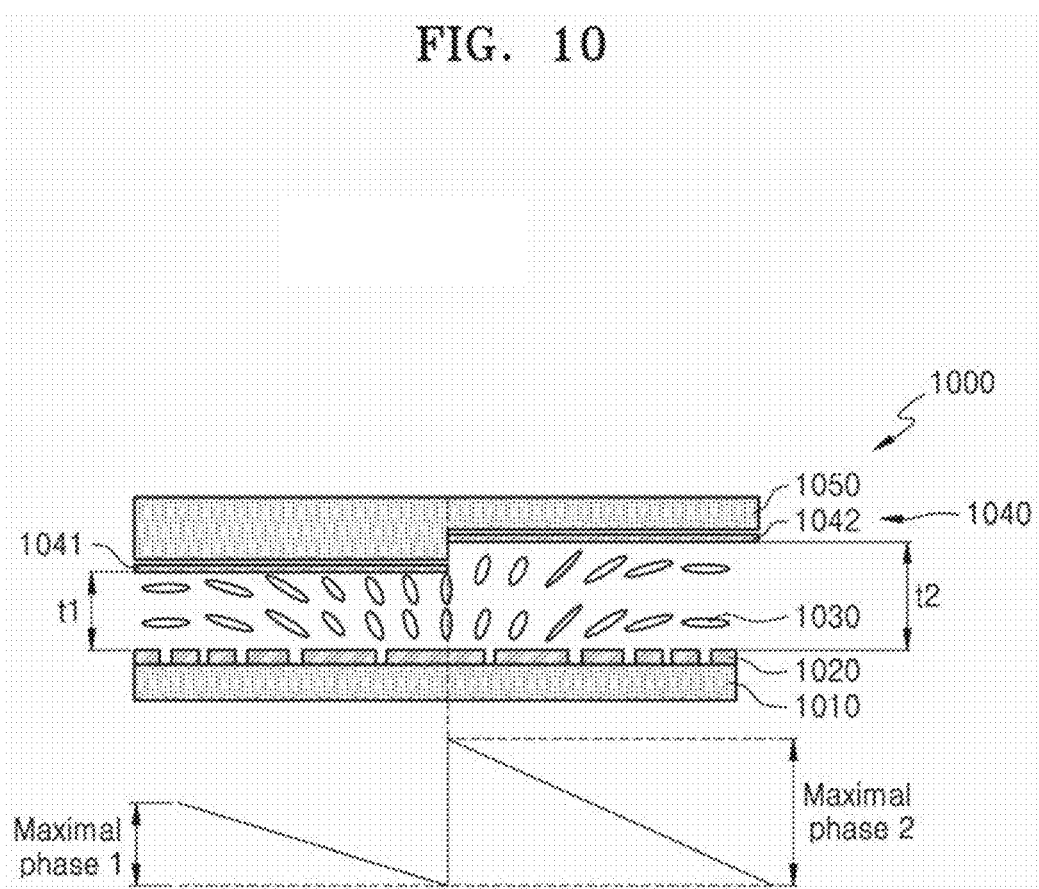
FIG. 10 is a diagram of a case in which an electro-active material layer of a tunable optical lens has different thicknesses in different diffraction zones, in a tunable optical lens according to an embodiment.

FIG. 10 is a diagram of a case in which an electro-active material layer 1030 of a tunable optical lens 1000 has different thicknesses in different diffraction zones, in the tunable optical lens 1000 according to an embodiment of the disclosure.

Referring to FIG. 10, a thickness t1 of the electro-active material layer 1030 in a first area, for example, an area of a first electrode pattern, may be different from a thickness t2 of the electro-active material layer 1030 in a second area, for example, an area of a second electrode pattern (t1≠t2). For example, on a surface of a second substrate 1050 where a common electrode 1040 is provided, the surface facing the electro-active material layer 1030, as the surface in a second area is etched such that a first common electrode 1041 in a first area and a second common electrode 1042 in the second area are formed to have a step, the thickness of the electro-active material layer 1030 may vary. The thickness of the electro-active material layer 1030 may vary by forming a step in the height of a first substrate 1010 where a control electrode 1020 is provided. Such a configuration may enable obtaining a different maximal phase with respect to a different electrode pattern in the control electrode 1020 of the tunable optical lens 1000.

The structure of the tunable optical lens according to the above-described embodiments may form a different phase profile corresponding to a different performance characteristic, for example, having a maximal phase from 2π to 12π, with respect to a different portion of an aperture (as a non-limiting example, in terms of diffraction efficiency and chromatic aberration). In other words, different optical zones may be formed in an aperture of a tunable optical lens. As a result, for example, in a diffraction zone having a maximal phase of 2π, a maximum diffraction efficiency is provided by comparing with a diffraction zone having a higher maximal phase, and in contrast, in a diffraction zone having a maximal phase of 12π, chromatic aberration may be reduced by comparing with a diffraction zone having a lower maximal phase.

Next, a detailed example embodiment of a tunable optical lens according to an embodiment of the disclosure is described. It should be understood that this embodiment is for illustrative purposes only and is not limited thereto. In an embodiment, a tunable optical lens has a control electrode pattern. A diameter of an electrode pattern in which electrode components include IZO is 30 mm. The control electrode pattern includes thirty (30) diffraction zones having a shape of rings in a central area, that is, a first electrode pattern area, and 2*38 diffraction zones having a shape of rings in a peripheral area, that is, a second electrode pattern area. Each of the diffraction zones in the central area includes 48 ring electrode components. Each of the diffraction zones in the peripheral area includes 24 ring electrode components. A minimum width of the electrode component is 2.8 μm. The total electrode number of control electrode patterns according to the present embodiment is 3264=48*30+24*2*38=48*68.

A tunable optical lens according to the present embodiment has an optical power and a diffraction efficiency value shown below in Table 1.

TABLE 1

| Optical power, D | Diffraction efficiency in the central area, % | Diffraction efficiency in the peripheral area, % | Diffraction efficiency in an overall lens, % |
|---|---|---|---|
| 0.5 | 99.9 | 99.4 | 99.6 |
| 1 | 99.4 | 97.7 | 97.9 |
| 1.5 | 98.7 | 95.0 | 96.7 |
| 2 | 97.7 | 91.2 | 94.1 |
| 3 | 95.0 | 81.1 | 87.3 |

The diameter of the central area of a tunable optical lens is about 16 mm. A lowest diffraction efficiency value in the central area is 95%. A radial width in the peripheral area is 8 mm to 15 mm. The lowest diffraction efficiency value obtained with respect to the overall tunable optical lens is 87% when a tunable optical lens aperture diameter is 30 mm. For comparison, for example, as in examples disclosed in U.S. Pat. Nos. 8,885,139 and 8,988,649, when a lens having one electrode pattern is in use, the lowest diffraction efficiency was 81% when a lens aperture diameter is 20 mm (In an electrode pattern, due to a technical limit in the size of control electrode, it is impossible for a lens aperture diameter to reach 30 mm in a proto type). Accordingly, in the tunable optical lens according to the above embodiment, a high diffraction efficiency is achieved with a large aperture diameter.

According to the above-described embodiments, at least two electrode patterns included in the control electrode pattern of the tunable optical lens generate two or more phase profiles having different quantization levels, in detail, a phase profile having a relatively high quantization level provided in the central area of an aperture of the tunable optical lens, and at least one phase profile having at least one relatively low quantization level provided in one or more diffraction zones closer to an outer edge of a tunable optical lens aperture, that is, at a side far from the center of the lens aperture. Due to the above arrangement, in the central area of the tunable optical lens aperture, a high diffraction efficiency is provided, which may be very important in providing a sense of reality with respect to a virtual object image. In an embodiment, a phase profile with respect to an electrode pattern located in areas, for example, areas closer to the edge of a tunable lens aperture, that are not located at a central portion of the tunable lens aperture may have the same maximal phase and the same quantization level, or a different maximal phase and a different quantization level.

Next, an electronic apparatus to which the tunable optical lenses according to the above-described embodiments are applied is described below.

Figure 11:
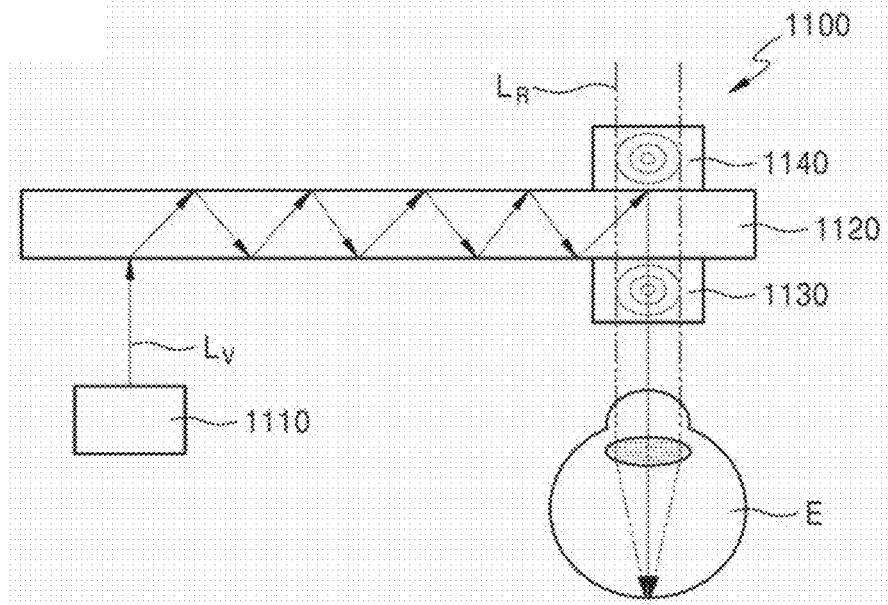
FIG. 11 is a diagram of a configuration that an electronic apparatus according to an embodiment includes a tunable optical lens.

FIG. 11 is a diagram of a configuration that an electronic apparatus 1100 according to an embodiment of the disclosure includes a tunable optical lens.

The electronic apparatus 1100 according to an embodiment of the disclosure may include an AR system and/or a virtual reality (VR) system (hereinafter, collectively referred to as an AR/VR system). A display device of the electronic apparatus 1100 may include a virtual object image source 1110, an optical waveguide 1120, a display component, and first and second tunable optical lenses 1130 and 1140. The virtual object image source 1110 is a device for generating an optical virtual object image. In an embodiment, the virtual object image source 1110 may include an image panel such as a liquid crystal display (LCD), a liquid crystal on silicon (LCOS) display, a digital light processing (DLP) display, a micro-LED display, and the like. In an embodiment, the virtual object image source 1110 may include a scanning optical system that scans a light beam in one dimension or two dimensions. The optical waveguide 1120 may connect the virtual object image source 1110, a display component, and the first and second tunable optical lenses 1130 and 1140 according to the disclosure. The optical waveguide 1120 may include a transparent material and have a flat plate shape. A display component is an optical member for imaging a virtual object image. The display component may include, for example a diffraction lattice, a mirror, or a micro mirror array, which is provided on one surface, both surfaces, or inside the optical waveguide 1120. The optical waveguide 1120 may be located between the first tunable optical lens 1130 and the second tunable optical lens 1140. The first tunable optical lens 1130 may be located between the optical waveguide 1120 and an eye E of a user. The second tunable optical lens 1140 may be located on a surface of the optical waveguide 1120 facing the real world.

The first and second tunable optical lenses 1130 and 1140 according to the present embodiment may be used by both of a user with a normal vision and a user with refraction abnormality. For a user with a normal vision, the first tunable optical lens 1130 has an optical power D0=0, and is used to deliver a virtual object image from the virtual object image source 1110 toward the eye E of a user. The second tunable optical lens 1140 may be used to correct the optical power induced by the first tunable optical lens 1130 so that an external real world (real world) is seen without interruption.

For a user with refraction abnormality, for example, presbyopia/myopia/hyperopia, the first tunable optical lens 1130 may be used to deliver a virtual object image that is corrected with an optical power value needed to correct the presbyopia/myopia/hyperopia. In this case, the second tunable optical lens 1140 is used to correct refraction abnormality, for example, presbyopia/myopia/hyperopia, of the eye E of a user so that the real world is clearly seen without interruption.

Figure 12:
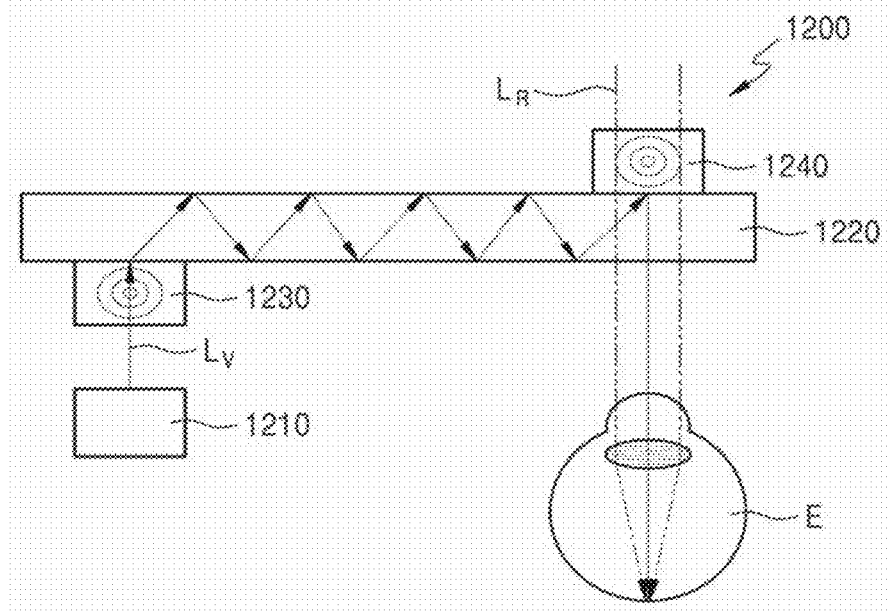
FIG. 12 is a diagram of a configuration that an electronic apparatus according to an embodiment includes a tunable optical lens.

FIG. 12 is a diagram of a configuration that an electronic apparatus 1200 according to an embodiment of the disclosure includes a tunable optical lens.

The electronic apparatus 1200 according to an embodiment of the disclosure may include an AR/VR system.

A display device of the electronic apparatus 1200 may include a virtual object image source 1210, an optical waveguide 1220, a display component for imaging a virtual object image, and first and second tunable optical lenses 1230 and 1240.

The first tunable optical lens 1230 may be arranged in front of the virtual object image source 1210. In other words, the first tunable optical lens 1230 may be located between the virtual object image source 1210 and the optical waveguide 1220. The second tunable optical lens 1240 may be located on a surface of the optical waveguide 1220 facing the real world. The first and second tunable optical lenses 1230 and 1240 may be implemented by the tunable optical lenses according to the above-described embodiments, and may correct refraction abnormality (presbyopia/myopia/hyperopia, and the like) of the eye E of a user so that the real world and a virtual object image may be clearly observed without interruption. Furthermore, the embodiments described with reference to FIGS. 11 and 12 removes the necessity of a use of specially designed glasses or lenses to correct vision of a user with a part of a display device in an AR/VR system.

Figure 13:
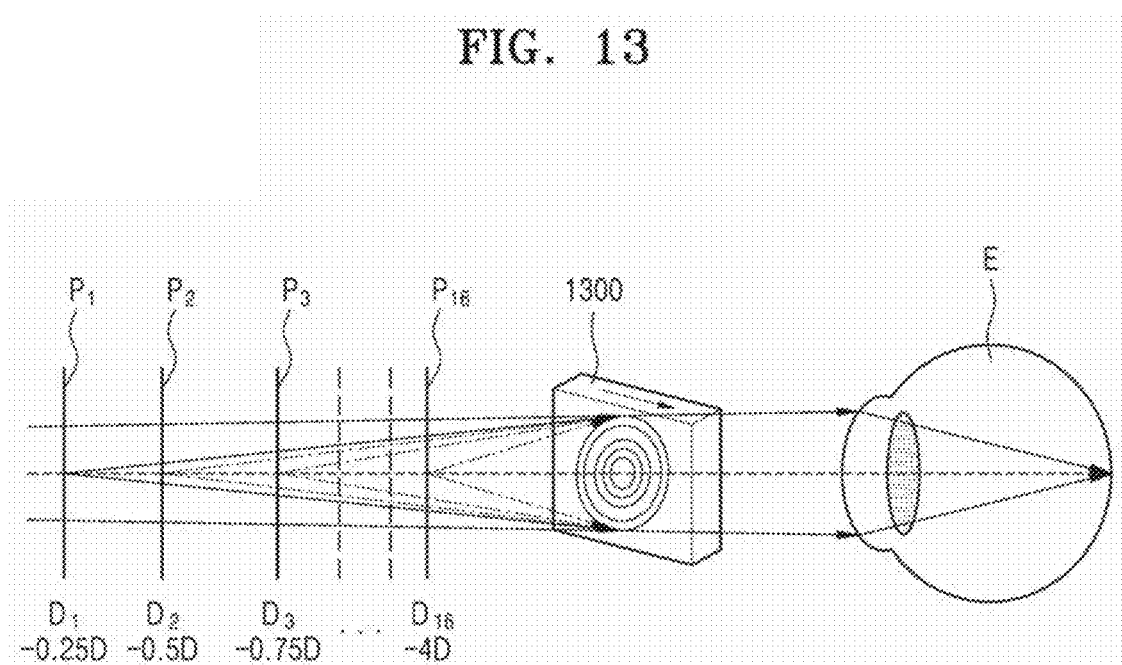
FIG. 13 is a diagram of a method of correcting a refraction abnormality of a user's eye by using a tunable optical lens according to an embodiment.

FIG. 13 is a diagram of a method of correcting refraction abnormality of the eye E of a user by using a tunable optical lens 1300 according to an embodiment of the disclosure.

Referring to FIG. 13, the tunable optical lens 1300 may be arranged in front of an eye of a user with myopia.

The tunable optical lens 1300 may have various optical powers. For example, the tunable optical lens 1300 may adjust optical power in sixteen (16) steps from $D_1$=−0.25 D to $D_{16}$=−4 D.

A focal plane provided by the tunable optical lens 1300 may be formed corresponding to an optical power value of the tunable optical lens 1300. For example, when a focus of a naked eye of a myopia user is located at a long-range P1, as illustrated in FIG. 13, the focus of a user's eye may be moved by the optical power of the tunable optical lens 1300 to a focal plane P16 corresponding to $D_{16}$=−4 D. Accordingly, in the present embodiment, the tunable optical lens 1300 may compensate for refraction abnormality of a user's eye with an optical power of a maximum 4 D.

The tunable optical lens 1300 may include a polarization-dependent tunable optical lens having a refractive index that varies depending on polarization.

The tunable optical lens 1300 may be understood as the second tunable optical lens in some embodiments described with reference to FIGS. 11 and 12.

Figure 14:
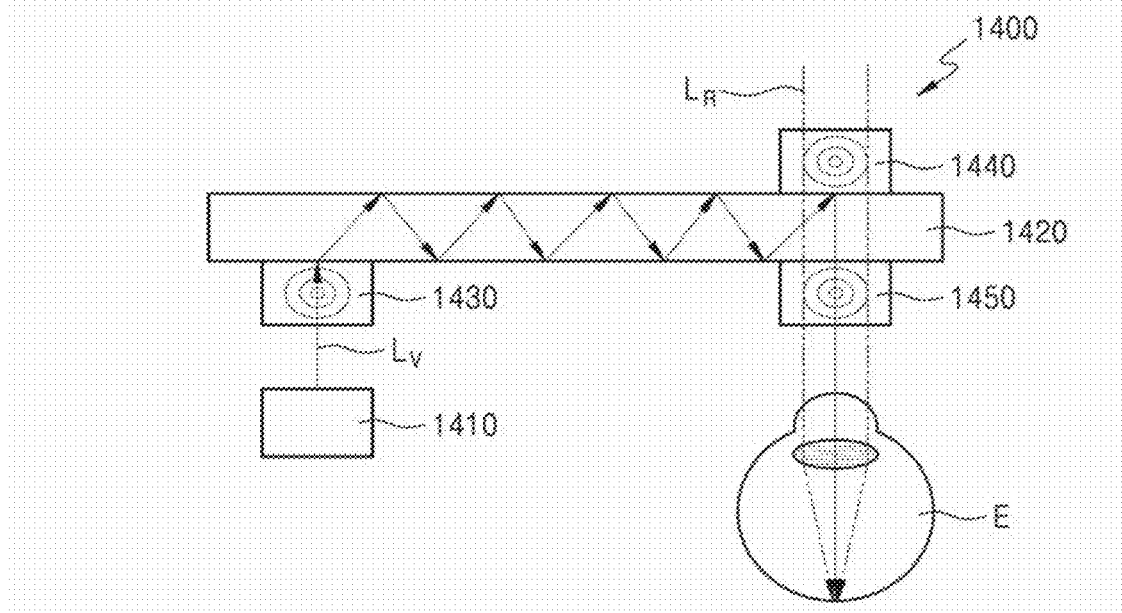
FIG. 14 is a diagram of a configuration including a tunable optical lens in an electronic apparatus according to an embodiment.

FIG. 14 is a diagram of a configuration including a tunable optical lens in an electronic apparatus according to an embodiment of the disclosure.

FIG. 14 illustrates a display device 1400 of an AR system according to an embodiment of the disclosure. Referring to FIG. 14, the display device 1400 according to an embodiment of the disclosure may include a virtual object image source 1410, an optical waveguide 1420, a display component for imaging a virtual object image, and first, second, and third tunable optical lenses 1430, 1440, and 1450. The first tunable optical lens 1430 may be arranged in front of the virtual object image source 1410. In other words, the first tunable optical lens 1430 may be located between the virtual object image source 1410 and the optical waveguide 1420. The second tunable optical lens 1440 may be located on a surface of the optical waveguide 1420 facing the real world. The third tunable optical lens 1450 may be located on a surface of the optical waveguide 1420 facing the eye E of a user. The first, second, and third tunable optical lenses 1430, 1440, and 1450 may be implemented by the tunable optical lenses according to the above-described embodiments, and may correct refraction abnormality (presbyopia/myopia/hyperopia, and the like) of the eye E of a user so that the real world and a virtual object image may be clearly observed without interruption.

The display device 1400 according to the present embodiment provides a dual mode by using the first to third tunable optical lenses 1430, 1440, and 1450.

A first mode is an operation mode for a user with normal vision. In the first mode, the second tunable optical lens 1440 may be used to compensate for an optical power induced by the third tunable optical lens 1450 to clearly see the external world through a display device without interruption. The third tunable optical lens 1450 may be used to deliver a virtual object image from the virtual object image source 1410.

A second mode is an operation mode of the display device 1400 to correct refraction abnormality (for example, presbyopia/myopia/hyperopia) of a user's eye in an AR/VR system. The first tunable optical lens 1430 is used to deliver a virtual object image that is corrected with an optical power value needed to compensate for presbyopia and/or myopia/hyperopia, and the second tunable optical lens 1440 is used to correct refraction abnormality (presbyopia and/or myopia/hyperopia) of a user's eye to clearly see the real world without interruption through the display device 1400.

In a non-limiting example, the disclosed tunable optical lens is used in a display device of an AR system to control the depth of a displayed image and/or virtual object image of a real world object and/or correct the refraction abnormality of a user's eye.

Furthermore, in some embodiments, an array of one or more tunable optical lenses may be used, for example, a plurality of lenses may be sequentially arranged. This may be useful in terms of an obtainable diameter of an optical system needed in an application device and an increase in the maximum optical power of a tunable optical lens system.

A user of a tunable optical lens that is dependent on or independent of polarization may provide an additional merit. For example, a polarization-dependent tunable optical lens may independently control parameters of an image by separating a virtual object image from a real world image by polarization.

Furthermore, the disclosure is not limited to the use of liquid crystal, for example, nematic liquid crystal, smectic liquid crystal, or cholesteric liquid crystal, as an electro-active material of a tunable optical lens. According to various embodiments, polymer gel, electro-active polymer, liquid crystal polymer, polymer dispersed liquid crystal, polymer stabilized liquid crystal, or a self-assembled non-linear supramolecular structure may be used as an electro-active material of a tunable optical lens. This is advantageous in that a tunable optical lens is applicable to a specific application field in terms of the characteristics such as a response time, an amount of an applied driving voltage, and a liquid crystal orientation control method.

The tunable optical lens according to the disclosure may be used as a non-limiting example, in a display device (an image generation device) of an AR/VR system. Furthermore, the tunable optical lens according to the disclosure may be used for helmet-mounted displays, vehicle head-up displays (HUDs), smart glasses, display devices for tablet computers, smart phones and other portable and/or wearable computing devices. One or more tunable optical lens according to the disclosure may be used in the display devices. Furthermore, the tunable optical lens according to the disclosure may be used for glasses for vision correction with adjustable focal length.

The tunable optical lens according to the disclosure may have a large aperture.

The tunable optical lens according to the disclosure may have a high diffraction efficiency.

The tunable optical lens according to the disclosure may adjust focus according to not only the positions of a virtual object image and/or real world object, but also the direction of an eye, in a display device of an AR/VR system.

Although the tunable optical lens may be implemented as tunable liquid crystal lenses, the disclosure is not limited to the use of liquid crystal as an electro-active material, and other electro-active material may be used and such a non-limiting example is proposed in the disclosure.

In the above, although embodiments have been described, these are merely examples, and those skilled in the art to which the present disclosure pertains could make various modifications and changes from these descriptions. Thus, the above-described embodiments are examples in all aspects and should not be for purposes of limitation. For example, each constituent element described to be a single type may be embodied in a distributive manner. Likewise, the constituent elements described to be distributed may be embodied in a combined form.

The tunable optical lens and the electronic apparatus employing the same are described with reference to the embodiments illustrated in the drawings to help the overall understanding of the disclosure. The disclosure is not limited to the above embodiments, and those skilled in the art to which the present disclosure pertains could make various modifications and changes from these descriptions. Therefore, it will be understood by those of ordinary skill in the art that various changes in form and details may be made therein without departing from the spirit and scope of the disclosure as defined by the following claims.

What is claimed is:

1. A tunable optical lens having an adjustable focal length, the tunable optical lens comprising:
   an electro-active material layer; and
   a control electrode comprising a plurality of electrode components,
   wherein the control electrode comprises at least two electrode patterns, each of the at least two electrode patterns being configured to generate one or more different diffraction zones,
   wherein the at least two electrode patterns are configured to generate different phase profiles from each other with respect to light transmitted through the at least two electrode patterns, when a voltage is applied to the control electrode,
   wherein each electrode pattern of the at least two electrode patterns comprises at least one electrode group,
   wherein each electrode component in any one electrode group in any one electrode pattern of the at least two electrode patterns is connected to a corresponding electrode component in another electrode group in the any one electrode pattern through a bus,
   wherein each of the at least one electrode group is configured to generate at least one phase profile, and
   wherein a number of buses connecting electrode components of each electrode group of a p-th electrode pattern among the at least two electrode patterns is bp-1 times less than a number of buses connecting electrode components of an electrode pattern among the at least two electrode patterns, wherein b is an integer.

2. The tunable optical lens of claim 1, wherein a number of electrode components in each of at least one electrode group of a first electrode pattern among the at least two electrode patterns is the same, and
   wherein a number of electrode components in at least one electrode group of a p-th electrode pattern among the at least two electrode patterns is the same and is equal to K/bp-1, where K is the number of electrode components in the at least one electrode group of the first electrode pattern and b is an integer.

3. The tunable optical lens of claim 2, wherein the first electrode pattern is located at a center of a lens aperture of the tunable optical lens, and
   wherein the p-th electrode pattern is sequentially numbered from the center of the lens aperture of the tunable optical lens to an outside of the lens aperture.

4. The tunable optical lens of claim 1, wherein, for each of the different phase profiles, heights of at least some quantization levels in the phase profile are different from heights of other quantization levels in the phase profile.

5. The tunable optical lens of claim 1, further comprising a bus and a circuit component provided between at least some of the plurality of electrode components and the bus.

6. The tunable optical lens of claim 5, wherein the circuit component comprises at least one from among a resistor, a capacitor, an inductor, or a diode.

7. The tunable optical lens of claim 1, further comprising K buses connecting the plurality of electrode components,
wherein the K buses are respectively connected to K electrode components in each diffraction zone of a first electrode pattern among the at least two electrode patterns, and
wherein only (1/b)*K buses of the K buses are respectively connected to the plurality of electrode components in each diffraction zone of a second electrode pattern adjacent to the first electrode pattern among the at least two electrode patterns.

8. The tunable optical lens of claim 1, wherein a maximal phase of a phase profile generated by a first electrode pattern among the at least two electrode patterns is the same as a maximal phase of a phase profile generated by a second electrode pattern among the at least two electrode patterns.

9. The tunable optical lens of claim 1, wherein a maximal phase of a phase profile generated by a first electrode pattern among the at least two electrode patterns is different from a maximal phase of a phase profile generated by a second electrode pattern among the at least two electrode patterns.

10. The tunable optical lens of claim 1, further comprising a circular aperture, wherein at least one of the plurality of electrode components has a concentric ring shape.

11. The tunable optical lens of claim 1, wherein the at least two electrode patterns comprise P electrode patterns sequentially arranged from a center of a lens aperture,
wherein a number of electrode components in each diffraction zone of a first electrode pattern of the P electrode patterns that is closest to the center of the lens aperture is K, and
wherein a radius rpmk of a k-th electrode component in an m-th diffraction zone of a p-th electrode pattern is equal to:

$$r_{pmk} = \sqrt{A_p \cdot 2\left(m_p - 1 + \frac{k}{K}\right) \cdot \frac{\lambda h}{D}},$$

wherein Ap is an integer indicating a minimal possible maximal phase difference in the p-th electrode pattern, mp is a number of diffraction zones of the p-th electrode pattern, $\lambda$ is a wavelength of incident light, h is a height of a phase profile having a multiple of $2\pi$ radian, and D is a minimum optical power of the tunable optical lens.

12. The tunable optical lens of claim 1, wherein a distance of a first electrode pattern of the at least two electrode patterns from a center of a lens aperture is smaller than a distance of a second electrode pattern of the at least two electrode patterns from the center of the lens aperture, and
wherein a width of an electrode component of the second electrode pattern is greater than a width of an electrode component of the first electrode pattern.

13. The tunable optical lens of claim 1, further comprising a polygonal aperture,
wherein the plurality of electrode components comprises at least one electrode component having a vertical stripe shape or a horizontal stripe shape.

14. A tunable optical lens having an adjustable focal length, the tunable optical lens comprising:
an electro-active material layer; and
a control electrode comprising a plurality of electrode components,
wherein the control electrode comprises at least two electrode patterns, each of the at least two electrode patterns being configured to generate one or more different diffraction zones, and
wherein the at least two electrode patterns are configured to generate different phase profiles from each other with respect to light transmitted through the at least two electrode patterns, when a voltage is applied to the control electrode,
wherein each of the different phase profiles comprises a plurality of quantization levels, and
wherein a number of the plurality of quantization levels in a phase profile generated by each electrode group of a p-th electrode pattern among the at least two electrode patterns is bp-1 times less than a number of the plurality of quantization levels in a phase profile generated by each electrode group of a first electrode pattern among the at least two electrode patterns, wherein b is an integer.

15. The tunable optical lens of claim 14, wherein for each of the different phase profiles, all heights of the plurality of quantization levels in the phase profile are equal.

16. An electronic apparatus comprising one or more tunable optical lenses having an adjustable focal length,
wherein each of the one or more tunable optical lenses comprises:
an electro-active material layer; and
a control electrode comprising a plurality of electrode components,
wherein the control electrode comprises at least two electrode patterns, each of the at least two electrode patterns being configured to generate one or more different diffraction zones,
wherein the at least two electrode patterns are configured to generate different phase profiles from each other with respect to light transmitted through the at least two electrode patterns, when a voltage is applied to the control electrode,
wherein each electrode pattern of the at least two electrode patterns comprises at least one electrode group,
wherein each electrode component in any one electrode group in any one electrode pattern of the at least two electrode patterns is connected to a corresponding electrode component in another electrode group in the any one electrode pattern through a bus, and
wherein a maximal phase of a phase profile generated by a first electrode pattern among the at least two electrode patterns is different from a maximal phase of a phase profile generated by a second electrode pattern among the at least two electrode patterns.

17. The electronic apparatus of claim 16, comprising an augmented reality system or a virtual reality system.

* * * * *